US008931748B2

(12) United States Patent
Bowman et al.

(10) Patent No.: US 8,931,748 B2
(45) Date of Patent: Jan. 13, 2015

(54) ARTICULATING MONITOR ARM WITH CABLE AND SPRING

(75) Inventors: Stephen J. Bowman, Allentown, PA (US); Bradley A. Derry, Easton, PA (US); Odd N. Oddsen, Jr., Easton, PA (US); David VanDuzer, Slatington, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 13/319,723

(22) PCT Filed: Jun. 9, 2010

(86) PCT No.: PCT/US2010/038058
§ 371 (c)(1),
(2), (4) Date: Nov. 10, 2011

(87) PCT Pub. No.: WO2011/155934
PCT Pub. Date: Dec. 15, 2011

(65) Prior Publication Data
US 2012/0267497 A1    Oct. 25, 2012

(51) Int. Cl.
*E04G 3/00* (2006.01)
*F16M 13/02* (2006.01)
*F16M 11/10* (2006.01)
*F16M 11/20* (2006.01)
*F16M 11/24* (2006.01)

(52) U.S. Cl.
CPC ............. *F16M 13/022* (2013.01); *F16M 11/10* (2013.01); *F16M 11/2014* (2013.01); *F16M 11/2092* (2013.01); *F16M 11/24* (2013.01); *F16M 2200/044* (2013.01); *F16M 2200/063* (2013.01); *F16M 2200/065* (2013.01); *F16M 2200/068* (2013.01); *Y10S 248/917* (2013.01)
USPC ............ 248/280.11; 248/292.13; 248/292.11; 248/917

(58) Field of Classification Search
USPC ........ 248/162.1, 280.11, 282.1, 283.1, 284.1, 248/288.51, 292.11, 292.13, 297.11, 349.1, 248/917, 919, 920, 274.1, 278.1, 276, 248/281.11, 291.1, 292.12; 361/681–683
See application file for complete search history.

(56) References Cited

U.S. PATENT DOCUMENTS 906,874 A * 12/1908 Hallowell ...................... 248/569
1,564,886 A * 12/1925 O'Neill ......................... 248/568
(Continued)

FOREIGN PATENT DOCUMENTS

GB          659561 A    10/1951
WO     2011060224 A1    5/2011

OTHER PUBLICATIONS

European Patent Office; International Search Report and Written Opinion of the International Searching Authority; Mailed Nov. 30, 2011.

*Primary Examiner* — Terrell McKinnon
*Assistant Examiner* — Monica Millner
(74) *Attorney, Agent, or Firm* — Design IP

(57) ABSTRACT

An extension arm including an articulating portion that approximately counterbalances the mass of the articulating portion and any objects connected thereto, for example an electronic device, throughout the positional range of the articulating portion. In some embodiments according to the disclosed inventive concepts a spring coupled to a cable is used, the cable being routed along a bearing surface and then attached within the articulating portion. In some embodiments, the bearing surface may be located on a pivotable member that rotates in correspondence with the articulating portion. In various embodiments, the spring may be located within the articulating arm, a base portion in operative engagement with the articulating portion, or entirely external to the extension arm.

6 Claims, 21 Drawing Sheets

(56) References Cited

U.S. PATENT DOCUMENTS

| | | | | |
|---|---|---|---|---|
| 1,644,231 A * | 10/1927 | Bosworth | | 248/568 |
| 2,416,910 A * | 3/1947 | Crosby et al. | | 248/585 |
| 2,547,532 A * | 4/1951 | Mendelsohn | | 248/292.11 |
| 2,665,870 A | 1/1954 | De Wiess | | |
| 3,239,184 A | 3/1966 | Kirkeby | | |
| 3,280,322 A * | 10/1966 | Kirkeby | | 248/584 |
| 3,359,927 A | 12/1967 | Janus | | |
| 3,498,577 A | 3/1970 | Mehr | | |
| 3,820,752 A * | 6/1974 | Oram | | 248/284.1 |
| 3,874,309 A | 4/1975 | Cowley | | |
| 3,903,812 A | 9/1975 | Cowley | | |
| 3,908,560 A | 9/1975 | Horner et al. | | |
| RE28,767 E | 4/1976 | Kuhlmann et al. | | |
| 3,973,748 A | 8/1976 | Nagasaka | | |
| 4,107,769 A * | 8/1978 | Saluja | | 362/402 |
| 4,160,536 A * | 7/1979 | Krogsrud | | 248/280.11 |
| 4,266,747 A * | 5/1981 | Souder et al. | | 248/280.11 |
| 4,494,177 A * | 1/1985 | Matthews | | 362/402 |
| 4,768,762 A | 9/1988 | Lund | | |
| 4,770,384 A * | 9/1988 | Kuwazima et al. | | 248/281.11 |
| 4,852,842 A * | 8/1989 | O'Neill | | 248/284.1 |
| 4,953,822 A * | 9/1990 | Sharber et al. | | 248/281.11 |
| 5,016,153 A | 5/1991 | Gismondi | | |
| 5,340,072 A * | 8/1994 | Halbirt | | 248/279.1 |
| 5,348,260 A * | 9/1994 | Acevedo | | 248/280.11 |
| 5,564,667 A | 10/1996 | Copeland et al. | | |
| 5,584,596 A | 12/1996 | Greene | | |
| 5,683,064 A | 11/1997 | Copeland | | |
| 5,718,406 A | 2/1998 | Long | | |
| 5,826,846 A | 10/1998 | Buccieri et al. | | |
| 5,884,880 A * | 3/1999 | Rice | | 248/279.1 |
| 6,070,839 A * | 6/2000 | Brenner et al. | | 248/123.11 |
| 6,113,046 A * | 9/2000 | Wang | | 248/278.1 |
| 6,378,829 B1 * | 4/2002 | Strater et al. | | 248/276.1 |
| 6,394,403 B1 * | 5/2002 | Hung | | 248/276.1 |
| 6,609,691 B2 * | 8/2003 | Oddsen, Jr. | | 248/278.1 |
| 6,732,988 B2 * | 5/2004 | Ihalainen et al. | | 248/276.1 |
| 6,899,308 B2 | 5/2005 | Chow et al. | | |
| 7,252,277 B2 * | 8/2007 | Sweere et al. | | 248/371 |
| 7,367,376 B2 * | 5/2008 | Llagostera Forns | | 160/66 |
| 7,478,786 B2 | 1/2009 | Copeland | | |
| 7,546,994 B2 * | 6/2009 | Altonji et al. | | 248/276.1 |
| 7,637,463 B2 | 12/2009 | Yen et al. | | |
| 7,837,674 B2 * | 11/2010 | Cooper | | 606/1 |
| 8,091,841 B2 * | 1/2012 | Jones et al. | | 248/125.2 |
| 8,181,927 B2 * | 5/2012 | Farrow | | 248/292.11 |
| 8,286,927 B2 * | 10/2012 | Sweere et al. | | 248/297.21 |
| 8,500,722 B2 * | 8/2013 | Cooper | | 606/1 |
| 2004/0124328 A1 * | 7/2004 | Cvek | | 248/280.11 |
| 2006/0185563 A1 | 8/2006 | Sweere et al. | | |
| 2013/0161465 A1 * | 6/2013 | Huang | | 248/278.1 |

\* cited by examiner

ARTICULATING MONITOR ARM WITH CABLE AND SPRING

CROSS REFERENCE TO RELATED APPLICATIONS

This application is the U.S. National Stage of PCT Application Ser. No. PCT/US10/38058, filed on Jun. 9, 2010, which is incorporated herein by reference in its entirety.

BACKGROUND OF THE INVENTION

The herein disclosed inventive concepts relate to the field of articulating arms for supporting devices, for example electronic displays (e.g. monitors).

Existing articulating arms use a spring or gas cylinder connected to the arm to provide a counterbalance force thereto, so as to support the mass of the articulating arm and any devices attached thereto (e.g. an electronic display) throughout the positional range of the arm. Many known articulating arms are configured to support a device of a known mass or a very narrow range of masses. Some of these known arms use a coiled spring having a fixed uniform spring rate. In these arms, adjustment of the coiled spring assembly can prove difficult, and it may not be possible to swap between devices of varying mass without changing the internal components of the articulating arm, e.g. the spring, which is both a costly and time-consuming process.

An additional problem relating to coiled spring assemblies is that it may be difficult for them to properly accommodate the combined mass of the arm and the attached device as the articulating arm moves through its range of angular positions. The multitude of individual angular positions of the arm within its range of angular positions can place greatly different counterbalance requirements on the coiled spring assembly, and these counterbalance requirements typically change dynamically as the articulating arm is positioned through said range of angular positions. Because standard coiled springs have a linear force response as they are elongated or compressed, known articulating arms employing coiled springs alone as the counterbalance-force providing means are unable to properly replicate the approximate counterbalance force needed to support the articulating arm (and any device attached thereto) throughout its positional range.

Recent efforts to address this issue have included employing a pivotable clevis member connected to a gas cylinder, the pivotable clevis assembly acting to dynamically adjust the counterbalance force provided by the gas cylinder to the articulating arm as it is positioned throughout its range of angular positions. U.S. patent application Ser. No. 11/544,076, filed Oct. 6, 2006 and entitled "EXTENSION ARM WITH MOVING CLEVIS," which is incorporated herein by reference as if fully set forth, discloses an exemplary pivotable clevis assembly. Some drawbacks of a continued reliance on the use of gas cylinders include that they are both costly and prone to failure, and that placement of the gas cylinder within the arm limits the ability to decrease the overall size of the articulating arm. Further, gas cylinders lose strength over time, and therefore must be periodically replaced. Moreover, the use of a pivotable clevis member adds an additional amount to the overall cost of producing the articulating arm.

Further, as electronic displays have become smaller and lighter, it is desirable to produce articulating arms having slimmer profiles, for example for aesthetic purposes. Reducing the size and weight of an articulating arm also reduces the cost of producing said arms, due to material costs savings. Maintenance of the spring or gas cylinder within an articulating arm limits the potential for reducing the size of the articulating arm.

Therefore, new extension arm assemblies which overcome these and other problems are desired.

SUMMARY OF THE INVENTION

In one respect the invention comprises an arm for supporting an electronic device, the arm comprising: a base portion having a support mount for securing the base portion to a support surface; an articulating portion having a first end, a second end, a top surface, and a range of angular positions, the first end being connected to a first endcap and being rotatable about a first pivot axis, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being configured to maintain a substantially constant relative rotational position between the first endcap and the second endcap throughout the range of angular positions; a cable having first and second connection points, the first connection point being located within the articulating portion, the second connection point being external to the articulating portion; a force-supplying component connected to the first or second connection point, the force-supplying component exerting a restorative force through the cable so that a supporting force is exerted on the articulating portion, the supporting force acting to oppose rotation of the second end of the articulating portion in the negative rotational direction; and a bearing surface having a profile, the bearing surface being positioned to maintain contact with the cable throughout the range of angular positions, the profile being shaped so that the supporting force increases as the articulating portion is rotated from the maximum positive angular position to the horizontal angular position and decreases as the articulating portion is rotated from the horizontal angular position to the maximum negative angular position.

In another respect, the invention comprises an arm for supporting an electronic device, the arm comprising: a base portion having a support mount for securing the base portion to a support surface; an articulating portion having a first end, a second end, a top surface, and a range of angular positions, the first end being connected to a first endcap and being rotatable about a first pivot axis, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being configured to maintain a substantially constant relative rotational position between the first endcap and the second endcap throughout the range of angular positions; a cable having first and second connection points, the first connection point being located within the articulating portion, the second connection point being external to the articulating portion; a force-supplying component connected to the first or second connection point, the force-supplying component exerting a restorative force through the cable so that a supporting force is exerted on the articulating portion, the supporting force acting to oppose rotation of the second end of the articulating portion in the negative rotational direction; and a bearing surface having a profile, the bearing surface being positioned to maintain contact with the cable throughout the range of angular positions; wherein the cable further comprises a unit pull defined as the distance that the cable moves relative to the force-supplying component when the articulating portion is rotated from the maximum positive angular position to the maximum negative angular position; wherein the profile is shaped so that less than half of the unit pull occurs when the articulating portion is rotated from the maximum positive angular position to the horizontal angular position and more than half of the unit pull occurs when the articulating portion is rotated from the horizontal angular position to the maximum negative angular position.

In yet another respect, the invention comprises an arm for supporting an electronic device, the arm comprising: a base portion having a support mount for securing the base portion to a support surface; an articulating portion having a first end, a second end, a top surface, and a range of angular positions, the first end being connected to a first endcap and being rotatable about a first pivot axis, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being configured to maintain a substantially constant relative rotational position between the first endcap and the second endcap throughout the range of angular positions; a cable having first and second connection points, the first connection point being located within the articulating portion, the second connection point being external to the articulating portion; a force-supplying component connected to the first or second connection point, the force-supplying component exerting a restorative force through the cable so that a supporting force is exerted on the articulating portion, the supporting force acting to oppose rotation of the second end of the articulating portion in the negative rotational direction; a bearing surface having a profile, the bearing surface being positioned to maintain contact with the cable throughout the range of angular positions, the bearing surface being part of a pivoting member that rotates with the articulating portion and about the first pivot axis, the profile being shaped so that the supporting force increases as the articulating portion is rotated from the maximum positive angular position to the horizontal angular position and decreases as the articulating portion is rotated from the horizontal angular position to the maximum negative angular position; and an adjustable clevis adapted to change the supporting force exerted on the articulating portion by the cable throughout the range of angular positions.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENTS

Figure 1:
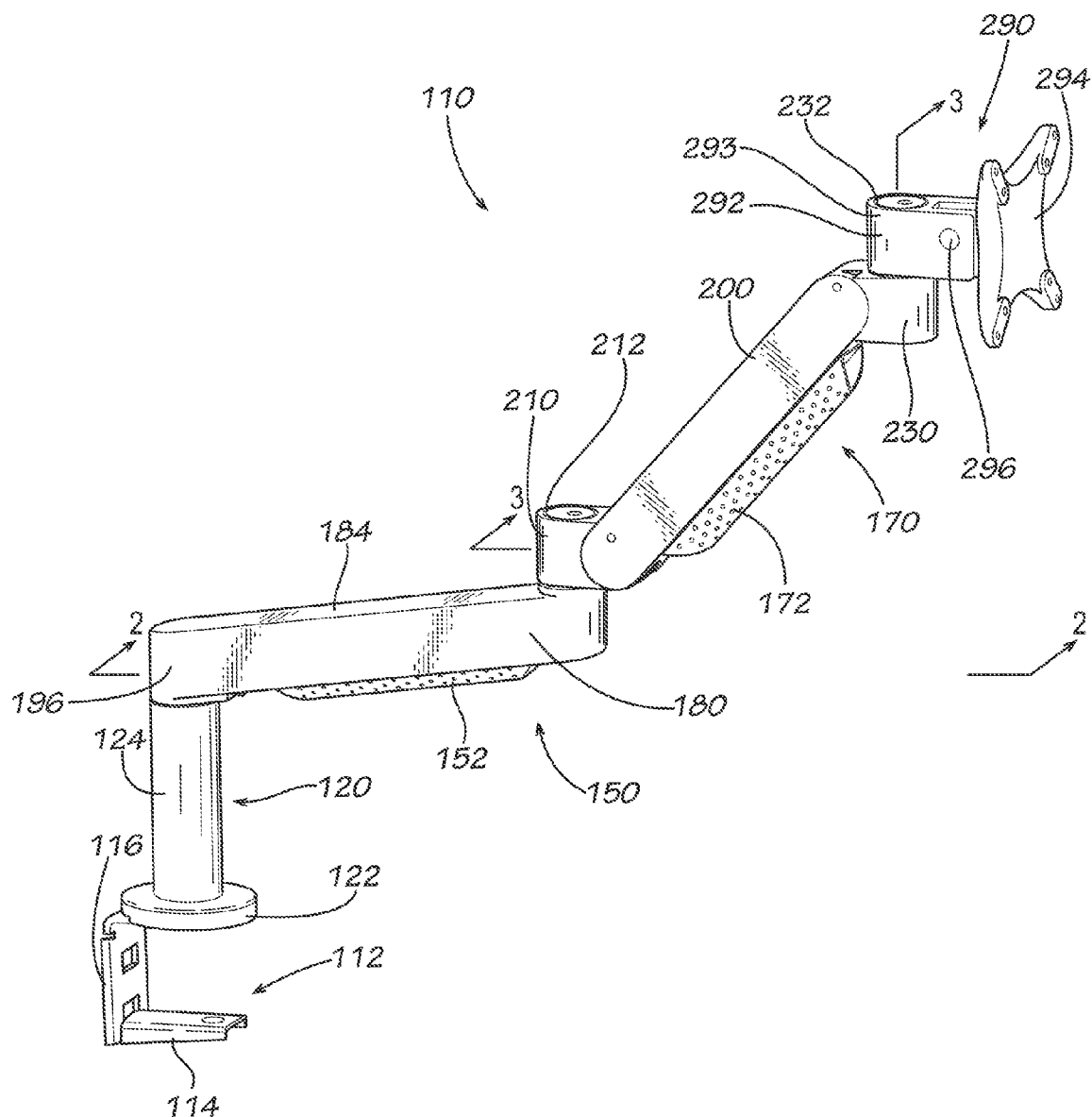
FIG. 1 is a perspective view of a first embodiment of an extension arm in accordance with the present inventive concept.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the inventive concept. It being understood that various changes may be made in the function and arrangement of elements without departing from the spirit and scope of the inventive concept, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

For the purposes of the specification and claims, the term "connected" means that two or more parts are affixed, coupled, fastened, joined, linked, and/or united, whether directly or indirectly through one or more intermediate parts.

For the purposes of the specification and claims, the terms "arc" and "geometric arc" mean any unbroken part of the circumference of a circle.

Figure 2:
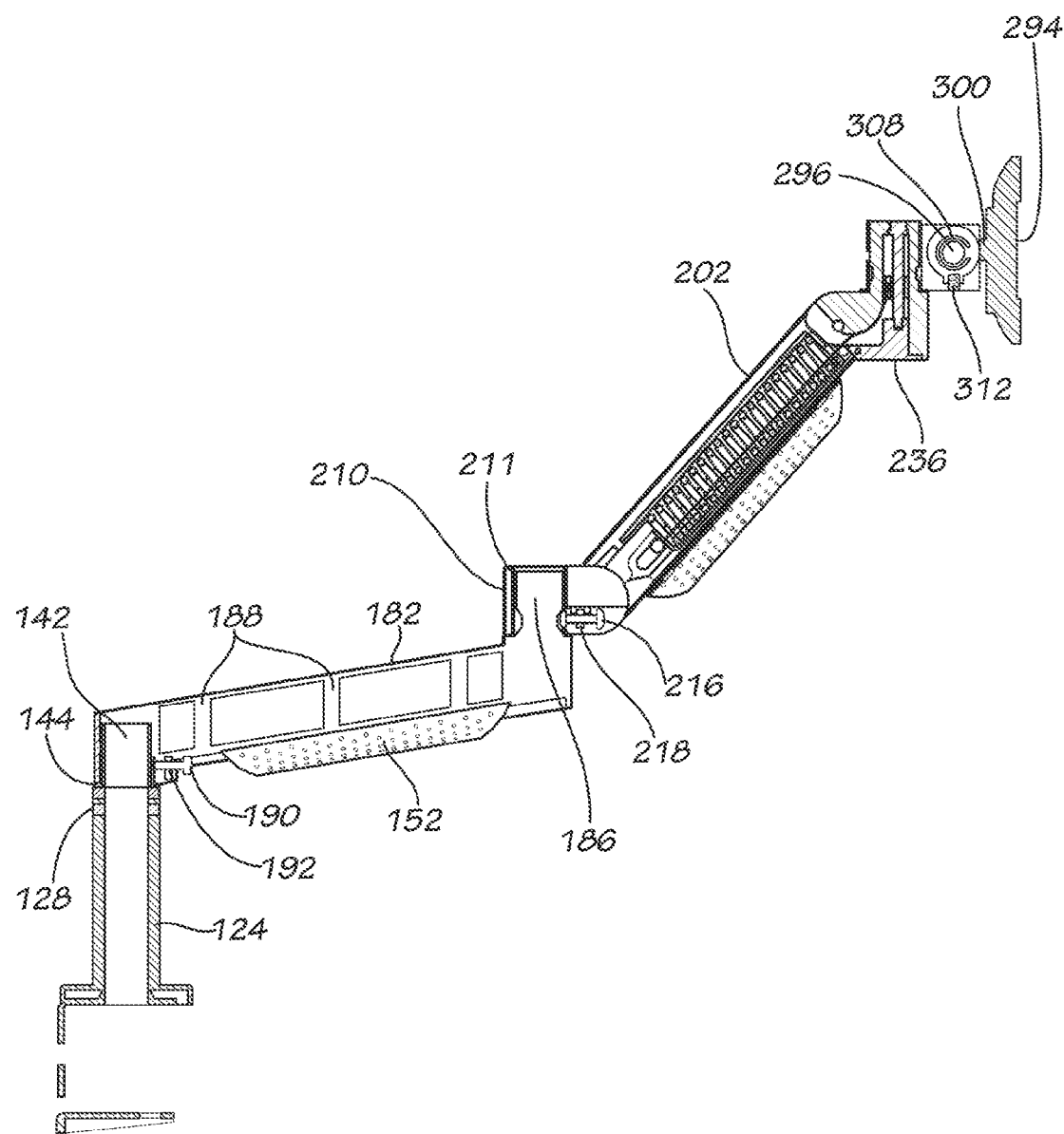
FIG. 2 is a sectional view taken along line 2-2 of FIG. 1.

FIGS. 1 and 2 depict a first embodiment of an extension arm 110 according to the present inventive concept. The extension arm 110 has a support mount 112, a base portion 120, a lower arm 150, an endcap 210, an upper arm 170, an endcap 230, and a device mount 290. In this embodiment, the support mount 112 comprises a first bracket component 114 and a second bracket component 116. The second bracket component 116 is attached to the base portion 120. In this embodiment, the base portion 120 comprises a base plate 122 which is placed at least partially in contact with a support surface (not shown), a pole spacer 124, a ring 128 located above the pole spacer 124, and a bushing 142 located on top of the ring 128. The pole spacer 124 may have an upper portion (not shown) that supports the bushing 142 therearound. In this embodiment, the pole spacer 124 spaces a coupling 196 of the lower arm 150 above the support surface, so as to provide clearance, where necessary, for the upper arm 170 to be adjusted downwardly, if desired. In other embodiments, it should be understood that the pole spacer 124 may be of a different height, or may be omitted entirely from the extension arm 110. If the pole spacer 124 is omitted, an elongated post (not shown) may be provided in its place. The post may be of any suitable height, for example the post may be tall enough such that multiple lower arm portions may be connected thereto. In this embodiment, the bushing 142 has a bushing lip 144 which rests against the ring 128. The bushing 142 is located around the upper portion of the pole spacer 124 and inside the coupling 196 of the lower arm 150, so as to permit rotation of the coupling 196 about the bushing 142 while preventing direct metal-on-metal contact. In this embodiment, the coupling 142 is comprised of plastic, though it should be understood that any suitable material may be used instead of plastic for the bushing 142. In this embodiment, the pole spacer 124 has solid ends. It should be understood that, in the alternative, the pole spacer 124 (or post) may be a hollow cylinder with open ends (i.e. tubiform in shape), thereby permitting a device cable (not shown) to be routed inside the pole spacer 124 (or post) and therefore hidden from view throughout the base portion 120 of the extension arm 110. It should be further understood that, in alternative embodiments, the pole spacer 124 (or post) may be of any other suitable shape having a generally hollow interior, or may be solid so that the device cable passage feature is not included throughout the base portion 120 of the extension arm 110.

In this embodiment, the lower arm 150 connects to the base portion 120, particularly about the pole spacer 124. In this embodiment, the lower arm 150 is a forearm 180. The coupling 196 of the forearm 180 fits over the upper portion of the pole spacer 124. In this embodiment, the forearm 180 is rigid, i.e. does not have an adjustable angle of elevation with reference to horizontal. It should be understood that, in alternate embodiments, the forearm 180 may have an adjustable angle of elevation relative to horizontal. In this embodiment, the forearm 180 has reinforcement members 188 on the interior thereof for added structural rigidity of the forearm 180. In the alternative, the reinforcement members 188 may be omitted from the forearm 180.

In this embodiment, when the coupling 196 of the forearm 180 is positioned around the upper portion of the pole spacer 124, as shown in FIGS. 1 and 2, the lower arm 150 (and by extension any components connected thereto) are rotatable about an axial centerline of the pole spacer 124 and/or the coupling 196, i.e. about an axis drawn vertically through the center of the pole spacer 124 as shown in FIG. 2. If a user wishes to restrict the rotational freedom of the lower arm 150 about said axis, the user may tighten the screw 190 such that it presses against bushing 142. The bushing 142 has a deflectable tab (not shown) that is engaged by the screw 190. As the screw 190 is tightened into the tab, the tab deflects towards and comes into frictional contact with the outer surface of the upper portion of the pole spacer 124, thereby preventing rotation of the coupling 196 about the pole spacer 124. In this embodiment, a square nut 192 is located around the threaded portion of the screw 190. The nut 192 is supported by the forearm 180 in an orientation that is substantially parallel with the tab of the bushing 142 when it is in its undeflected state. This maintains the threaded portion of the screw 190 in an orientation that is substantially perpendicular to the tab of the bushing 142, thereby maximizing the deflection force that the screw 190 applies to the tab of the bushing 142 as the screw 190 is tightened. Alternatively, the nut 192 may be omitted and a threaded hole (not shown) may be included directly in the coupling 196 of the forearm 180. In an alternative embodiment, the rotational position of the lower arm 150 may be fixed relative to the base portion 120, or the lower arm 150 and the base portion 120 may be formed together as an integral assembly. It should be understood that, in alternative embodiments, the bushing 142 could include a slot therein for permitting passage of a device cable therethrough. It should also be understood that one or more device cable clips (not shown) could be included on or near base portion 120, coupling 196, endcap 210, and/or endcap 230 for supporting and concealing a device cable.

In this embodiment, the lower arm 150 also comprises a forearm cover 184 which overlays the body 182 of the forearm 180 and conceals the reinforcement members 188 from view. In embodiments where the reinforcement members 188 are omitted from the forearm 180, the forearm cover 184 may be used to make accessible to a user the interior of the body 182 of the forearm 180, for example so that a device cable (not shown) may be routed therethrough. In this embodiment, the forearm cover 184 includes a plurality of deflectable tabs (not shown) which press against the interior of the body 182 to hold the forearm cover 184 in place. It should be understood that, in alternative embodiments, the forearm cover 184 may be shaped or configured differently so as to be attachable to the body 182 of the forearm 180, and may also include perforations for aesthetic purposes, for example perforations that match the perforations included on device cable covers 152, 172 in FIG. 1.

In this embodiment, the lower surface of the lower arm 150 may include one or more tabs (not shown) which engage one or more slots (not shown) in the device cable cover 152, thereby holding the device cable cover 152 adjacent to the bottom surface of the lower arm 150. The device cable cover 152 permits a device cable (not shown) to be routed therethrough, thereby substantially hiding the device cable from view over the lower arm 150 portion of the extension arm 110. In this embodiment, the device cable cover 152 contains perforations (not labeled) for aesthetic purposes. In alternative embodiments, the perforations on the device cable cover 152 may be omitted. In the alternative, the device cable cover 152 may be omitted entirely from the extension arm 110.

Figure 3A:
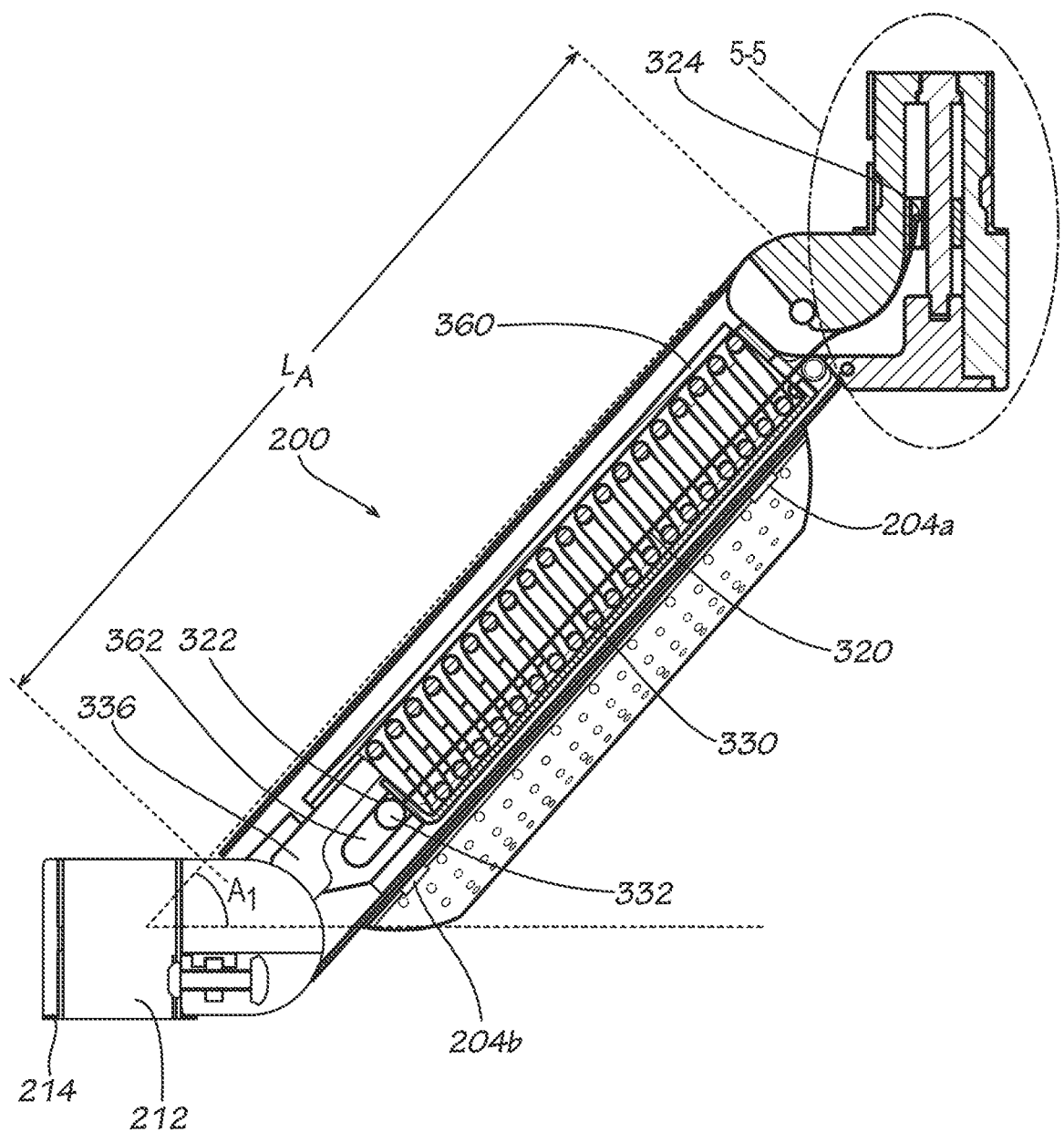
FIG. 3A is a partial sectional view of the articulating portion of the first embodiment with the articulating portion in a first position.

As best seen in FIGS. 2 and 3A, in this embodiment the forearm 180 further includes a forearm shaft 186 that extends upwardly from the body 182 of the forearm 180. The endcap 210 has a hollow coupling 211 which attaches around the shaft 186 of the forearm 180. The coupling 211 is rotatable about the shaft 186 to provide rotational freedom about an axis drawn vertically through the center of the coupling 211 as shown in FIG. 2. A bushing 212 having a bushing lip 214 at the bottom thereof is located between the outer surface of the forearm shaft 186 and the inner surface of the coupling 211. The bushing 212 is substantially identical to the bushing 142 described above in that it includes a deflectable tab (not shown) that, when deflected by movement of screw 216, presses against the outer surface of the forearm coupling 186 in order to prevent rotation of the endcap 210 (and by extension any components connected thereto) about the forearm shaft 186. Nut 218, which is located around the threaded portion of screw 216, is substantially identical to the nut 192 described above, and functions in a like manner. It should be understood that, in alternative embodiments, the bushing 212 could include a slot therein for permitting passage of a device cable therethrough.

Figure 5:
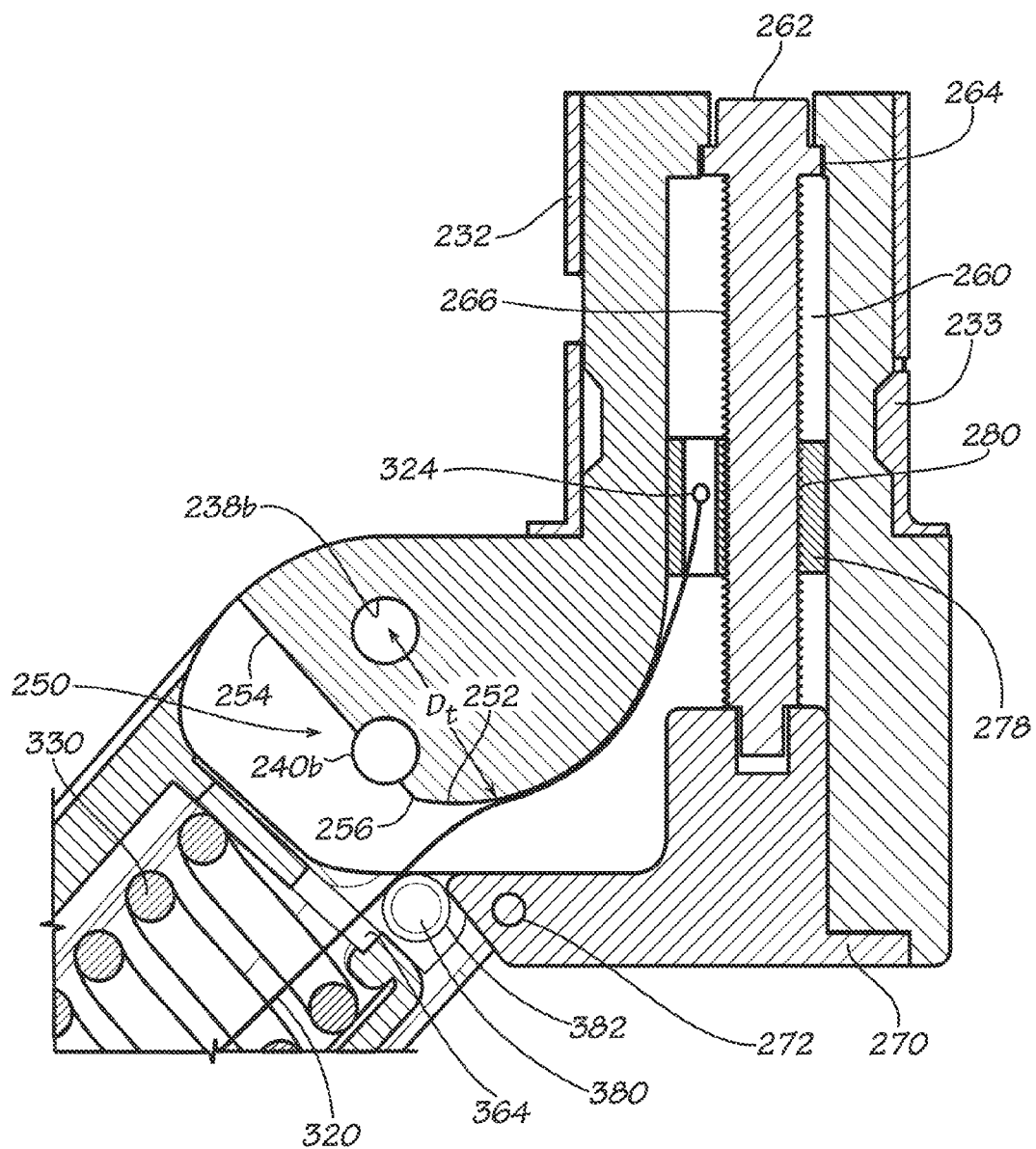
FIG. 5 is an enlarged partial view of area 5-5 of FIG. 3A.

The upper arm 170 is connected at a first end to the endcap 210 and at a second end to the endcap 230. As best seen in FIG. 5, the endcap 230 includes a shaft 236 that, in this embodiment, extends upwardly. A bushing 232 is located around the shaft 236 of the endcap 230. The bushing 232 may be substantially similar or identical to the bushings 142, 212 described above, or may be a simple bushing without a deflectable tab. If the bushing 232 is substantially similar or identical to the bushings 142, 212 described above, a screw, and optionally a nut (neither shown), may be used in a manner similar to those screw and nut combinations described above to manipulate a tab 233 of the bushing 232 into contact with the shaft 236 of the endcap 230 to prevent rotation of the device mount 290 (and by extension any components connected thereto) thereabout. It should be understood that, in alternative embodiments, the bushing 232 could include a slot therein for permitting passage of a device cable therethrough.

Referring again to FIGS. 1 and 2, the device mount 290 attaches to the endcap shaft 236. More specifically, in this embodiment, the device mount 290 comprises a tilter extension 292 including a hollow coupling 293 located at a first end thereof. The hollow coupling 293 fits around the bushing 232 such that the tilter extension 292 (and by extension any components connected thereto) are rotatable about an axial centerline of the endcap shaft 236 and/or the coupling 293, i.e. about an axis drawn vertically through the center of the shaft 236 as shown in FIG. 2. The tilter extension 292 is attached at a second end to an adapter plate 294, which is adapted to attach to a device (not shown), for example a video display or monitor. The adapter plate 294 may be equipped with one or more sets of hole patterns arranged according to one or more existing industry standards for video displays. For example, the holes may be arranged according to one or more pattern standards selected by the Video Electronics Standards Association (VESA).

In this embodiment, the adapter plate 294 is coupled to the tilter extension 292 via a tilter rocker 300, which is attached at a first end to the tilter extension 292 via a tilter pin 296 and at a second end to the adapter plate 294. As best shown in FIG. 2, the tilter rocker 300 has a cylindrical portion surrounding the tilter pin 296 and a shaft portion that connects with the adapter plate 294. Located between the cylindrical portion of the tilter rocker 300 and the tilter pin 296 is a tilter bushing 308, which in this embodiment is a split bushing having a cross-sectional shape approximating a "C". The tilter rocker 300 is generally rotatable about the tilter pin 296 to provide the adapter plate 294 with rotational freedom about an axis drawn parallel to the longitudinal axis of the tilter pin 296, i.e. about an axis perpendicular with the page as shown in FIG. 2. In order to arrest the rotational freedom of the tilter rocker 300 about said axis, the user may tighten a set screw 312 against the tilter bushing 308, which decreases the cross-sectional diameter of the tilter bushing 308 so that the inner surface of the tilter bushing 308 provides friction to the outer surface of the tilter pin 296. By tightening the set screw 312 while the adapter plate 294 is in the desired position, the user may thereby overcome the tendency of the adapter plate 294 to rotate downwardly about the tilter pin 296 by the force of gravity.

While one embodiment of a device mount 290 has been described above, in the alternative, any number of known device mounting apparatuses could be used in place of device mount 290 in conjunction with the remaining components of the extension arm 110. These include, but are not limited to, the various devices taught in U.S. Pat. No. 7,673,838, issued Mar. 9, 2010 and entitled "QUICK RELEASE ASSEMBLY FOR AN ELECTRONIC DEVICE, U.S. Pat. No. 7,472,458, issued Jan. 6, 2009 and entitled "TILTER APPARATUS FOR ELECTRONIC DEVICE HAVING BIAS ASSEMBLY," U.S. Pat. No. 6,505,988, issued Jan. 14, 2003 and entitled "TILTER FOR POSITIONING ELECTRONIC DEVICES," and/or U.S. Patent Application No. 61/249,789, filed Oct. 8, 2009 and entitled "TILTER FOR POSITIONING AN ELECTRONIC DEVICE," the disclosures all of which are incorporated herein by reference as if fully set forth. It should further be understood that any of the device mounting apparatuses incorporated herein by reference could be used in conjunction with any of the embodiments of an extension arm disclosed in this application.

In this embodiment, the upper arm 170 has an articulating portion 200, i.e. the angular position of the upper arm 170 is adjustable with respect to horizontal. In FIG. 3A, the articulating portion 200 is shown in a first angular position, which in this embodiment represents the maximum positive angular position of the articulating portion 200. Articulating portion angle A, which is measured between a first line drawn parallel to the top of the upper channel member (i.e. along the top surface of the articulating portion cover 202) and a second line drawn parallel with horizontal, represents a measurement of the angular position of the articulating portion 200 with respect to horizontal. In this embodiment, the angle $A_1$ is equal to approximately +45 degrees from horizontal.

As used herein, the term "horizontal" should be understood to refer to a plane that lies orthogonal to lines drawn along the respective rotational axes of the endcaps which are connected to the articulating portion. For purposes of the herein disclosure, it is to be assumed that the various embodiments of the extension arm are mounted to a support surface such that "horizontal" corresponds with a plane that is orthogonal to the direction of the force of gravity under normal conditions. In this configuration, when the articulating portion of the extension arm is in a 0-degree angular position, i.e. such that a line drawn along the upper surface of the articulating portion is orthogonal to said rotational axes of the endcaps, the line drawn along the upper surface of the articulating portion is also orthogonal to the direction of the force of gravity. It should be understood that any of the embodiments of the articulating portion disclosed herein could also be mounted to a support surface such that the 0-degree angular position of the articulating portion is not perpendicular to the direction of the force of gravity.

Figure 3B:
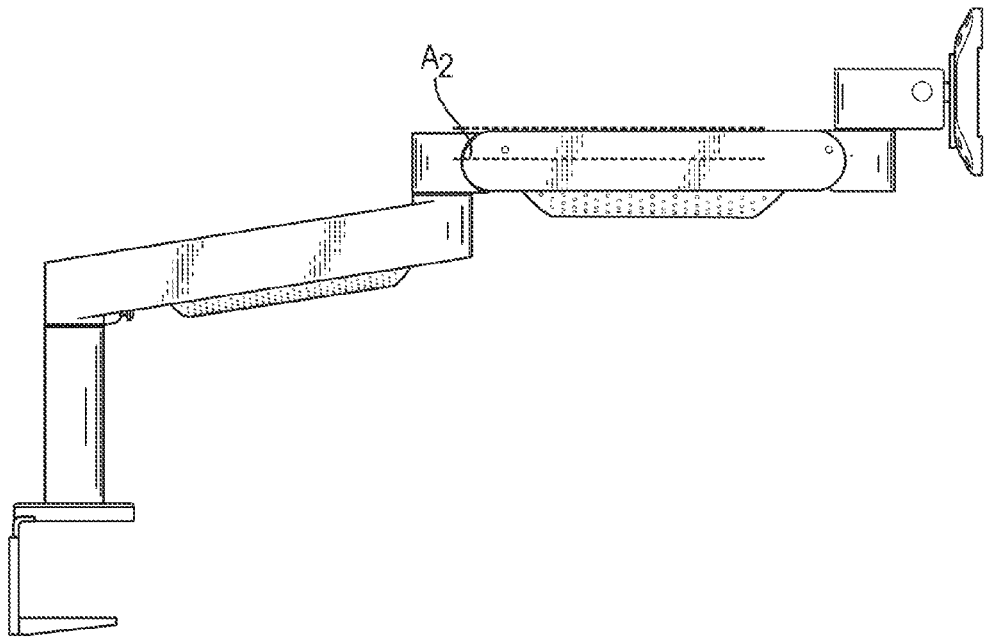
FIG. 3B is a side view of the first embodiment of the extension arm with the articulating portion in a second position.
Figure 3C:
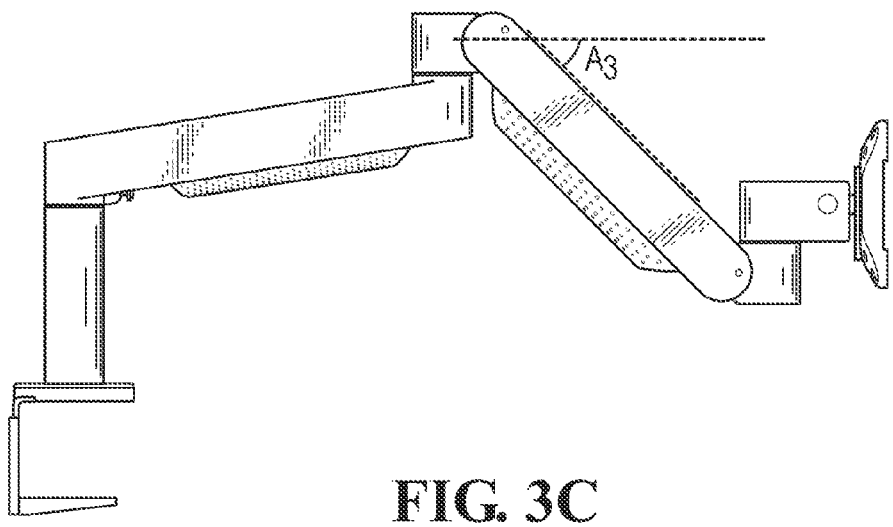
FIG. 3C is a side view of the first embodiment of the extension arm with the articulating portion in a third position.
Figure 4:
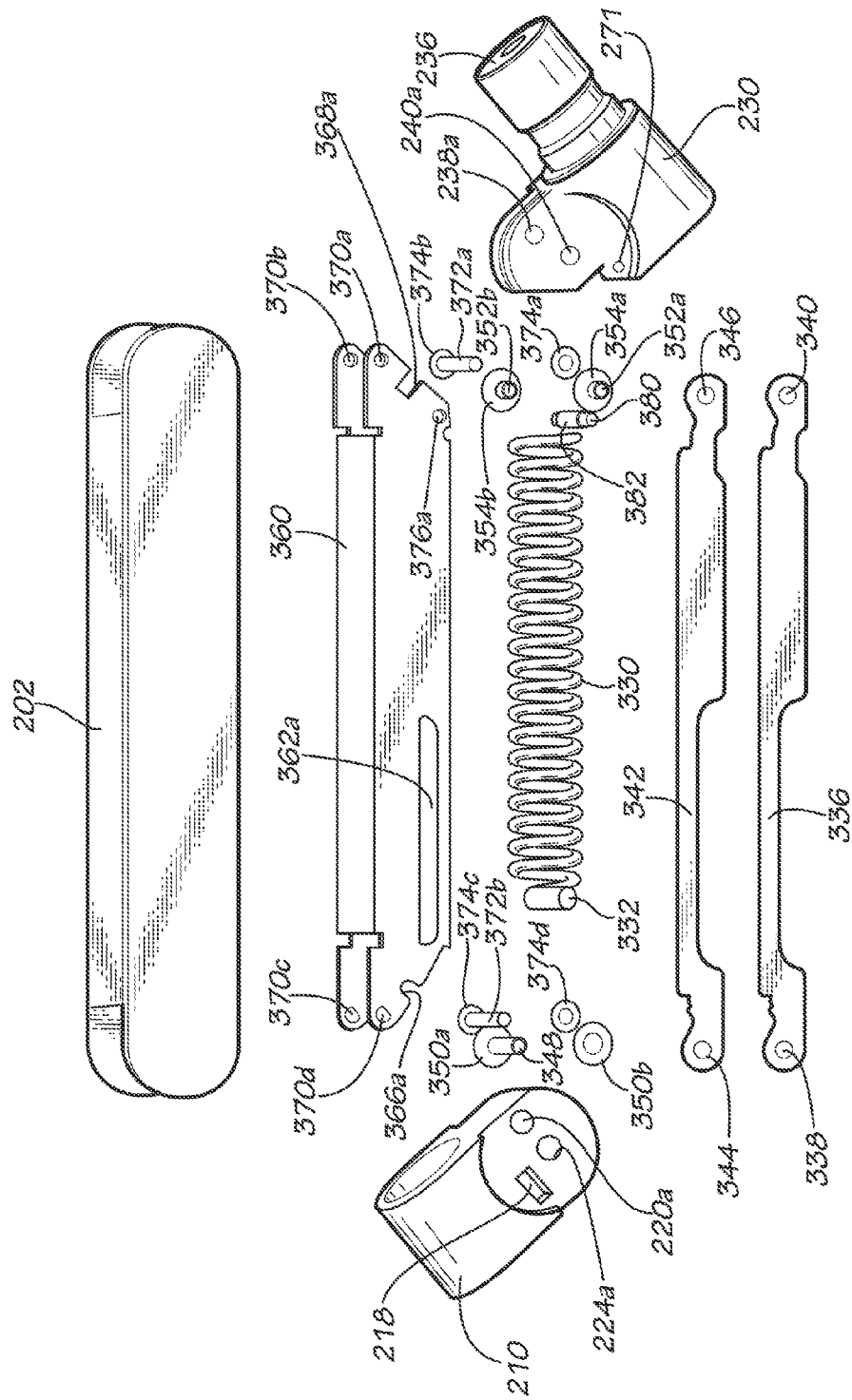
FIG. 4 is a partial exploded view of the components of the articulating portion according to the first embodiment.

FIGS. 3B and 3C depict the articulating portion 200 in additional angular positions, corresponding respectively with articulating portion angles $A_2$ and $A_3$. In FIG. 3B, the articulating portion 200 is shown in a second angular position corresponding with articulating portion angle $A_2$. Angle $A_2$ is equal to 0 degrees from—i.e. parallel with—horizontal. In FIG. 3C, the articulating portion 200 is shown in a third angular position corresponding with articulating portion angle $A_3$. Angle $A_3$ is equal to −45 degrees from horizontal. In this embodiment, this angle represents the maximum negative angular position of the articulating portion 200. Thus, in this embodiment, the articulating portion 200 is adjustable to angles between +45 and −45 degrees from horizontal, such that the articulating portion 200 has an angular range of 90 degrees. It should be understood that in other embodiments, the angular range of the articulating portion 200 may be greater or lesser than the above-noted angular range, have greater or lesser absolute values for its maximum positive and maximum negative angular positions, or have maximum positive and maximum negative angular positions with absolute values that are not equal.

Referring to FIGS. 1-4, the construction of the upper arm 170 of this embodiment will now be discussed. As noted above, in this embodiment, the upper arm 170 is an articulating portion 200. The articulating portion 200 comprises an articulating portion cover 202 and the device cable cover 172. The articulating portion cover 202 encloses and conceals from view the internal components of the articulating portion 200. The device cable cover 172 includes a plurality of holes (not shown) which accommodate a plurality of tabs (204a, 204b shown; two additional tabs not shown) located on the bottom surface of the articulating portion cover 202, thus holding the device cable cover 172 in place. The device cable cover 172 permits a device cable (not shown) to be routed therethrough, thereby substantially hiding the device cable from view over the upper arm 170 portion of the extension arm 110. In this embodiment, the device cable cover 172 contains perforations (not labeled) for aesthetic purposes. In alternative embodiments, the perforations on the device cable cover 172 may be omitted. In the alternative, the device cable cover 172 and/or the articulating portion cover 202 may be omitted entirely from the extension arm 110.

In this embodiment, the articulating portion 200 further includes a box 360 which encloses a spring 330 having a spring adjustment pin 332. The box 360 includes a pair of spring adjustment pin slots (362a shown; an additional spring adjustment pin slot not shown), which accommodate the spring adjustment pin 332 and in which the position of the spring adjustment pin 332 may be adjusted. Adjustment of the spring adjustment pin 332 within the spring adjustment pin slots (362a or additional spring adjustment pin slot) alters the length of the spring 330, thus altering the restorative force of the spring 330. A method by which the length of the spring 330 is adjusted will be discussed in detail below.

The box 360 is attached to the endcap 210 by placing the box rivet holes 370c, 370d located on the box 360 adjacent to and outside of the respective rivet holes (220a shown; an additional rivet hole not shown) located on the endcap 210, inserting a box rivet 372b through said four holes, and then securing the box rivet 372b. Washers 374c, 374d are placed, respectively, on either side of the endcap 210 between an endcap rivet hole (220a or additional rivet hole) and the corresponding rivet hole (370c or 370d) located on the box 360. The box 360 is attached to the endcap 230 by placing the box rivet holes 370a, 370b located on the box 360 adjacent to and outside of the respective rivet holes 238a, 238b (238b shown in FIG. 5) located on the endcap 230, inserting a box rivet 372a through said four holes, and then securing the box rivet 372a. Washers 374a, 374b are placed, respectively, on either side of the endcap 230 between an endcap rivet hole (238a or 238b) and the corresponding rivet hole (370a or 370b) located on the box 360. The notches (366a shown; an additional notch not shown) located in the box 360 adjacent the endcap 210 accommodate a stringer pin 348 as the articulating portion 200 is rotated throughout its angular range. The notches (368a shown; an additional notch not shown) accommodate rivet pins 352a, 352b as the articulating portion is rotated throughout its angular range.

Stringers 336, 342 also connect the endcap 210 to the endcap 230. Stringers 336, 342 are attached to the endcap 210 by placing the stringer pin holes 338, 344 respectively adjacent to and outside of the pin holes (224a shown; an additional pin hole not shown), inserting the stringer pin 348 through said four holes, and then securing the stringer pin 348. Washers 350a, 350b are placed, respectively, on either side of the endcap 210 between a pin hole (224a or additional pin hole) and the corresponding stringer pin hole (338 or 344). Stringers 336, 342 are attached to the endcap 230 by placing the stringer pin holes 340, 346 respectively adjacent to and outside of the rivet pin holes 240a, 240b (240b shown in FIG. 5), inserting the rivet pin 352a through the rivet pin hole 240a and the rivet pin 352b through the rivet pin hole 240b, and securing the respective rivet pins 352a, 352b. A washer 354a is placed on the side of the endcap 230 between rivet pin 352a and rivet pin hole 240a, and washer 354b is placed on the side of the endcap 230 between rivet pin 352b and pin hole 240b. The connections of the box 360 and the stringers 336, 342 with the endcaps 210, 230 maintain the articulating portion 200 in a parallelogram shape as the articulating portion 200 is moved through its range of angular positions. In other words, the articulating arm is configured to maintain a substantially constant relative rotational position between the endcaps 210, 230 throughout the range of angular positions. Stated yet another way, each of the endcaps 210, 230 has a longitudinal axis, and these two longitudinal axes remain parallel as the articulating arm is moved throughout its range of angular positions. It should be understood that this relationship between the endcaps exists in all of the herein disclosed embodiments.

It should be understood that any of the rivets or pins noted above could be replaced with other known parts which permit a rolling function, for example various types of fasteners, stalks, stems, rods, shaft, or pivot members. In this embodiment, the endcap 230 is also connected to a clevis bolt holder 270 via a fastener (not shown) routed through both a hole 271 located in the endcap 230 and an endcap mounting hole 272 located in the clevis bolt holder (see FIG. 5).

A roller pin 380 is inserted into roller pin holes (376a shown; an additional roller pin hole not shown) located on the box 360. Cable roller 382, which has a tubular shape with open ends, is placed around the roller pin 380 in between the sidewalls of the box 360. In this embodiment, the cable roller 382 is permitted to rotate around the outer surface of the roller pin 380 in order to reduce the amount of friction that is applied to a cable 320 by the moving components of the articulating portion 200 and to reduce wear on the cable 320. In alternate embodiments, the cable roller 382 may be omitted. In this embodiment, the box rivets 372a, 372b are split apart when installed in the respective rivet pin holes 240a, 240b (i.e. there is a gap between the medial ends thereof) so as to accommodate movement of the cable 320 therebetween without coming in contact with either of the box rivets 372a, 372b.

As best seen in FIGS. 3A and 5, in this embodiment, the cable 320 is connected to a first cable connection point 322 that corresponds with the spring adjustment pin 332. The cable 320 is routed from the first cable connection point 322, through the interior of the spring 330, and in a direction towards the endcap 230. The cable 320 is routed through a cable hole 364 located in the end of the box 360 and into the interior of the endcap 230. In the angular position of the articulating portion 200 depicted in FIGS. 3A and 5, the cable 320 comes in contact with the cable roller 382. Inside the endcap 230, the cable 320 is connected to a clevis nut 278 at a second cable connection point 324. In this embodiment, the cable 320 is connected at the second connection point 324 to the clevis nut 278 via a knot in the cable. In the alternative, the cable 320 may be attached at the second cable connection point 324 by other suitable affixation means, including but not limited to a fastener, fixed washer, wrapping, crimping, or welding of the cable 320, or the use of a suitable adhesive. The clevis nut 278 is attached to an adjustable clevis bolt 262 within a clevis slot 260. The clevis bolt 262 has a threaded portion 266 and a head 264. The head 264 may be slotted for accommodation of a flathead screwdriver, or otherwise shaped so as to accommodate known drive types, for example Phillips, hex, hex socket (Allen), star, or spanner head (snake-eye) drives. The clevis nut 278 has a threaded interior or clevis-bolt engaging portion 280, and an outer surface (not labeled) which is slidable within the clevis slot 260.

In this embodiment, the clevis bolt 262 is held in a captive position by the design of the clevis slot 260 and the clevis bolt holder 270, such that when the head 264 of the clevis bolt 262 is rotated, the clevis nut 278 moves up or down along the length of the threaded portion 266 of the clevis bolt 262 within the clevis slot 260. For example, assuming that the clevis bolt 262 and clevis nut 278 include standard right-handed threads, clockwise rotation of the head 264 of the clevis bolt 262 would move the clevis nut 278 upwards (i.e. towards the top of the page with respect to FIG. 5). Because the cable 320 is fixedly attached at the second cable connection point 324 located within the clevis nut 278, movement of the clevis nut 278 in an upward direction places additional tension along the length of the cable 320. The additional tensile force acting on the cable 320 is transferred along the length of the cable 320 towards the spring adjustment pin 332 located at the first cable connection point 322. As a result, the spring adjustment pin 332 is pulled in a direction towards the endcap 230, thereby compressing the spring 330. As the spring 330 compresses, the restorative force generated by the compressed spring 330 acts in an outwardly direction along the length of the spring 330. Since the spring 330 is held captive within the box 360 at the end of the spring 330 adjacent to the endcap 230, the restorative force of the spring 330 acts in a direction towards the first cable connection point 322 and is thus transferred to the cable 320 via the spring adjustment pin 332. The cable 320 thus supplies additional counterbalance force to the endcap 230 (and by extension any components connected thereto, including the device mount 290 and any attached device). In the above fashion, the articulating portion 200 may be adjusted to accommodate user devices of different masses without the need for replacing any of the components of the articulating portion 200.

In some applications, it is desirable to closely approximate the quantity of counterbalance force that is required to be applied to an articulating portion in order to support the mass of the arm (and any devices attached thereto) as the arm is adjusted through its full range of angular positions. Such "counterbalance force approximation" increases the smoothness of the movement of the articulating portion, and reduces the risk that the arm will deviate from the selected angular position due to the applied counterbalance force being either too great or too small.

According to one aspect of the present inventive concept, in this embodiment said "counterbalance force approximation" is achieved by routing the cable 320 about a bearing surface 250, which comprises a first portion 252, a second portion 254, and a transition surface 256 at which the first portion 252 and the second portion 254 meet. In this embodiment, the first portion 252 is a curved surface and the second portion 254 is a linear surface. In this embodiment, when the articulating portion 200 is in its maximum positive angular position (as shown in FIGS. 3A and 5), the cable 320 partially engages the first portion 252 before diverting away from the first portion 252 and routing through the cable hole 364. In this embodiment, as the articulating portion 200 is moved through its range of angular positions from +45 degrees down towards horizontal (i.e. 0 degrees, as shown in FIG. 3B), the cable 320 will come in contact with more of the first portion 252 until, at an approximately horizontal angular position of the articulating portion 200, the cable 320 will be in contact with substantially all of the first portion 252 up to the transition surface 256, and then will continue in a substantially horizontal direction through the cable hole 364. As the articulating portion 200 is moved through its range of angular positions from 0 degrees down towards its maximum negative angular position (−45 degrees in this embodiment, as shown in FIG. 3C), the cable 320 will remain in contact with substantially all of the first portion 252, but will begin to divert in a direction towards the second portion 254 before entering the cable hole 364. In other words, the path of the cable 320 will come closer to the second portion 254 as the articulating portion 200 is moved towards its maximum negative angular position. At no point throughout the angular range of the articulating portion 200, however, does the cable 320 come into contact with the second portion 254. As explained in further detail below, although in this embodiment the second portion 254 is a linear surface (in cross section) for ease of molding, the second portion 254 could be of any possible shape such that the cable 320 avoids contact with the second portion 254 as the articulating portion 200 is moved from a horizontal position down towards its maximum negative angular position. As used herein, the term "negative rotational direction" refers to rotation of the articulating portion in a direction towards its maximum negative angular position, and the term "positive rotational direction" refers to rotation of the articulating portion in a direction towards its maximum positive angular position. In the embodiments shown in the appended Figures, the negative rotational direction corresponds with clockwise rotation of the articulating portion, and the positive rotational direction corresponds with counter-clockwise rotation of the articulating portion.

In this embodiment, the transition surface 256, when viewed in cross-section, is arcuate in shape. The curvature of the transition surface 256 is supplied for the purpose of there being no sharp edges that could come in contact with, and potentially damage, the cable 320. It should be understood that, in alternative embodiments, the transition surface 256 may be of any suitable shape so as to permit the cable 320 to wrap thereabout without causing damage to the cable 320.

The terms "force" and "torque" are used in the below description and equations. However, it should be understood that for the sake of simplicity, units of Hertz$^2$ (i.e. seconds$^{-2}$ ($s^{-2}$)) have been excluded from the below description and equations. Moreover, for ease of calculation, in the below description and equations the mass of the articulating portion 200 itself has been omitted from consideration. Alternatively, it should be understood that this mass could be considered and included in the below-provided equations.

In this embodiment, the arrangement of the bearing surface 250 has been pre-determined so that as the articulating portion 200 is moved through a range of angular positions from its maximum positive angular position down to approximately a horizontal position, the wrapping of the cable 320 about the bearing surface 250 provides an increased quantity of torque along the length of the cable. This increased torque is transferred along the length of the cable 320 and is used to support the mass of any components attached to the articulating portion throughout this approximately supra-horizontal range of articulating portion angular positions. As the articulating portion 200 is moved through a range of angular positions from approximately the horizontal position down towards its maximum negative angular position, the cable 320 remains in contact with substantially all of the first portion 252 and increasingly comes closer to the second portion 254 without ever coming in contact therewith. However, because no additional force is required to approximate the quantity of force necessary to support the articulating portion 200 through this sub-horizontal range of articulating portion angular positions, the first portion 252 is cut-away starting at the transition surface 256, i.e. the point at which the second portion 254 begins.

As the articulating portion 200 is moved through its range of angular positions, the length $L_A$ (see FIG. 3A) of the articulating portion 200 comprises a horizontal length component and a vertical length component, which are calculated in this embodiment relative to horizontal. For example, in FIG. 3B, the articulating portion 200 is at a fully horizontal orientation (i.e. angle $A_2$ is equal to 0 degrees). In this orientation, the horizontal component $L_H$ of the length of the articulating portion 200 is equal to the length $L_A$ of the articulating portion, and the vertical component of the length of the articulating portion is zero. As stated above, in this embodiment the angle A is formed between a first line drawn parallel with the top surface of the articulating portion 200 and a second line drawn parallel with horizontal. At any chosen angle A, the horizontal component $L_H$ of the length $L_A$ of the articulating portion 200 is calculated by the following equation:

$$L_H = (\cos A)(L_A) \quad \text{(Equation 1)}.$$

As shown in Equation 2, below, the horizontal component of the length of the articulating portion 200 is used to calculate the torque created by the mass of any components attached to the articulating portion 200 about an axis adjacent to the bearing surface around which the articulating portion 200 rotates. In this embodiment, the rotation axis runs through the center of the rivet holes 238a, 238b located on the endcap 230, within which box rivet 372a rotates (see FIGS. 4 and 5). As best seen in FIG. 3A, the length $L_A$ of the articulating portion 200 is measured between the rotation axis and the opposing connection axis for the articulating portion 200, which in this embodiment is an axis drawn through the center of rivet holes (220a shown; an additional rivet hole not shown) located on the endcap 210, within which box rivet 372b rotates. For a selected angular position of the articulating portion 200, the value of the object-mass force $F_1$ has a first value.

$$F_1 = (L_H)(m_{obj}) \quad \text{(Equation 2)};$$

where $m_{obj}$ is equal to the mass of the object attached to the articulating portion 200.

In this embodiment, the precise locations of the rotational axis within the bearing surface 250, as well as the shape of the bearing surface 250, have been predetermined in order to approximate the value of a supporting force $F_2$ at the selected angular position of the articulating portion 200, which is calculated as described below. According to the above-described concept of counterbalance force approximation, for a particular angular position of the articulating portion 200, the value of the object-mass force $F_1$ is desirably within a particular difference of the value of the supporting force $F_2$. For example, the value of the object-mass force $F_1$ that corresponds with the 0 degree position of Angle A is within a desired difference of the value of the supporting force $F_2$ that corresponds with the 0 degree position of Angle A. The value of $F_2$ at the selected angular position of the articulating portion is calculated as follows:

$$F_2 = (F_s)(D_t) \quad \text{(Equation 3)};$$

where $F_2$ is the supporting force supplied by the cable at the cable connection point within the articulating portion; $F_s$ is the restorative force supplied by the spring; and $D_t$ is equal to a distance measured along a line drawn at a minimum length between (i) the rotational axis and (ii) a line drawn tangent to the path of the cable at the respective angular position of the articulating portion 200. An exemplary distance $D_t$, which corresponds with an angular position of the articulating portion 200 wherein angle A is equal to +45 degrees, is labeled in FIG. 5. The restorative force $F_s$ supplied by the spring at a given compression state of the spring is calculated by multiplying the spring rate of the spring by the distance that an end of the spring has moved from its equilibrium position, as shown in the below equation:

$$F_s = (s)(x) \quad \text{(Equation 4)};$$

where s is the spring rate of the spring; and x is the distance that an end of the spring has been displaced from its equilibrium position.

As will be appreciated by one having ordinary skill in the art, the spring rate of a given spring is the amount of mass needed to compress the spring a set distance, and typically has units of kilograms per millimeter or pounds per inch. For many springs, the spring rate is constant regardless of the displacement of the spring. As described in greater detail herein, to accommodate greater initial masses of the attached object (i.e. greater values of $m_{obj}$), the restorative force of the spring 330 may be adjusted, e.g. by pre-compressing the spring 330. Alternatively, the spring 330 may be replaced with a spring having a non-linear spring rate, such that the restorative force supplied by the spring would vary dynamically as the compression state of the spring is adjusted. An example of utilizing a spring having a non-linear force response is further described below.

It should be understood that, because the calculated values of $F_1$ and $F_2$ have units of mass-length (e.g. pounds-foot or kilograms-meter), the difference between the values of $F_1$ and $F_2$ also has units of mass-length. At the selected angular position of the articulating portion 200, the difference $F_3$ between the values of $F_1$ and $F_2$ are calculated as follows:

$$F_3 = F_1 - F_2 \quad \text{(Equation 5)}.$$

At the selected angular position of the articulating portion 200, in order to convert the difference value $F_3$ into a fourth value $m_f$ which has units of mass, we divide the difference value $F_3$ by the length $L_A$ of the articulating portion 200, as calculated below:

$$m_f = F_3 / L_A \quad \text{(Equation 6)}.$$

According to one method of applying the present inventive concept, the process of calculating the value of the fourth value $m_f$ has been repeated for a plurality of angular positions of the articulating portion 200. The location of the rotational axis within the bearing surface 250 is pre-determined in order to bring the value of the object-mass force $F_1$ within a desired difference of the value of the supporting force $F_2$ at a plurality of angular positions of the articulating portion 200, such that the value of $m_f$, when calculated, does not exceed a predetermined absolute value for any possible angular position of the articulating portion 200, as discussed in further detail below. Because $L_A$ is constant for a given articulating portion, $F_3$ also has a predetermined absolute value. The values of $F_1$ and $F_2$ may be calculated at particular angular increments between the maximum positive angular position and maximum negative angular position of the articulating portion 200, for example at 5 degree increments.

In some embodiments, the fourth value $m_f$ may be negative in at least some of the angular positions of the articulating portion 200. In these applications, the fourth value represents the portion of the mass of the object connected to the articulating portion 200 (i.e. the portion of the value of $m_{obj}$) that must be overcome by an additional counterbalance force. The maximum desired absolute value for the fourth value $m_f$ may be predetermined based on the quantity of counterbalance force that is desired to be transferred to the articulating portion 200 by friction in order to support the excess portion of the mass of the object $m_{obj}$. In the this embodiment, the predetermined absolute value for $m_f$ is 3.0 pounds (1.4 kg). In this embodiment, the additional counterbalance force is provided by applying friction to the articulating portion 200 via the various pins 348, 352a, 352b, 372a which connect the articulating portion 200 to the respective endcaps 210, 230. Alternatively, friction may be applied to the articulating portion 200 via other known means. In further alternate embodiments, the shape of the bearing surface 250 or the quantity of the counterbalance force applied by the spring 330 to the cable 320 may be varied so as to reduce the need for providing counterbalance force to the articulating portion 200 via friction.

In calculating the particular shape and dimensions of the bearing surfaces described herein, many cross-sectional shapes and component arrangements were considered. In one embodiment of a method of generating a bearing surface in accordance with the herein disclosed inventive concepts, a bearing surface having an approximately circular shape (when viewed in cross-section) was chosen. A cable was routed around the surface of the circular bearing surface, the cable being subject to a known restorative force via its engagement with a force-supplying component (e.g. a spring). The minimum distances between an arbitrarily chosen rotational axis within the bearing surface and a line drawn tangent to the path of the cable were calculated at various angular positions of the articulating portion. It was discovered that the torque generated by the cable wrapping around the bearing surface at sub-horizontal angular positions of the articulating portion had values that were substantially higher than what were necessary to provide appropriate counterbalance force to the articulating portion (i.e. to support the mass of the object connected thereto) through this range of angular positions. Consequently, the decision was made to delete a portion of the bearing surface starting at a transition surface that corresponds approximately with the horizontal position of the articulating portion. In this way, as the articulating portion moves through its sub-horizontal range of angular positions, the cable is clear of the bearing surface and therefore may come closer to the rotational axis, thereby reducing the quantity of counterbalance force (i.e. torque) that is transmitted to the articulating portion via its connection to the cable. In other words, the profile of the bearing surface was shaped so that the magnitude of the supporting force $F_2$ supplied to the articulating portion via the cable increases as the articulating portion is rotated from the maximum positive angular position to the horizontal angular position, and decreases as the articulating portion is rotated from the horizontal angular position to the maximum negative angular position. In the embodiments disclosed in FIGS. 1-18, the deleted portion of the bearing surface approximates, in cross-section, a geometric segment of a circle, which is defined in geometric terms as the area enclosed by the perimeter of a geometric chord and the corresponding geometric arc on said circle. In these embodiments, this deletion shape was chosen for ease of manufacture, since the deletion process involves a single, linear cut along the geometric chord of the circle (i.e. a single, planar cut in three dimensions). It should be understood that, in alternative embodiments, the deleted portion of the bearing surface may be of any suitable shape so that the cable does not come in contact with the bearing surface as the articulating portion moves throughout its sub-horizontal range of angular positions.

With reference to Equations 2 and 3 and the disclosure provided above, for an articulating portion having a given length and range of object masses attached thereto, Applicants attempted to approximately balance the forces $F_1$ and $F_2$ at given angular positions of the articulating portion by varying the spring rate of the spring and/or by varying the distance $D_t$. Changes to the distance $D_t$ were made by adjusting: (1) the radius of the bearing surface; (2) the location of the transition surface (cutaway surface) on the bearing surface; and/or the (3) position of the rotational axis. Applicants experimented with these variables in order to find the shape and dimensions of an appropriate bearing surface for a desired range of object masses (i.e. a desired range of masses of $m_{obj}$).

It should be understood that the above-described inventive concept and solutions are equally applicable to each of the embodiments described herein. The inventive concept discussed herein provides a reasonable approximation of the necessary counterbalance forces for a range of masses that would be attached to the articulating portion. It should be understood that this solution is a compromise over a more exact bearing surface or counterbalance force approximation that could be generated for a fixed quantity of mass. In the herein disclosed embodiments, applicants were interested in generating a counterbalance force profile for a range of masses between approximately 5.0 and 20.0 pounds (2.3 and 9.1 kg). It should be understood that the herein disclosed inventive concepts may be utilized for other mass values or ranges of mass values.

Figure 17:
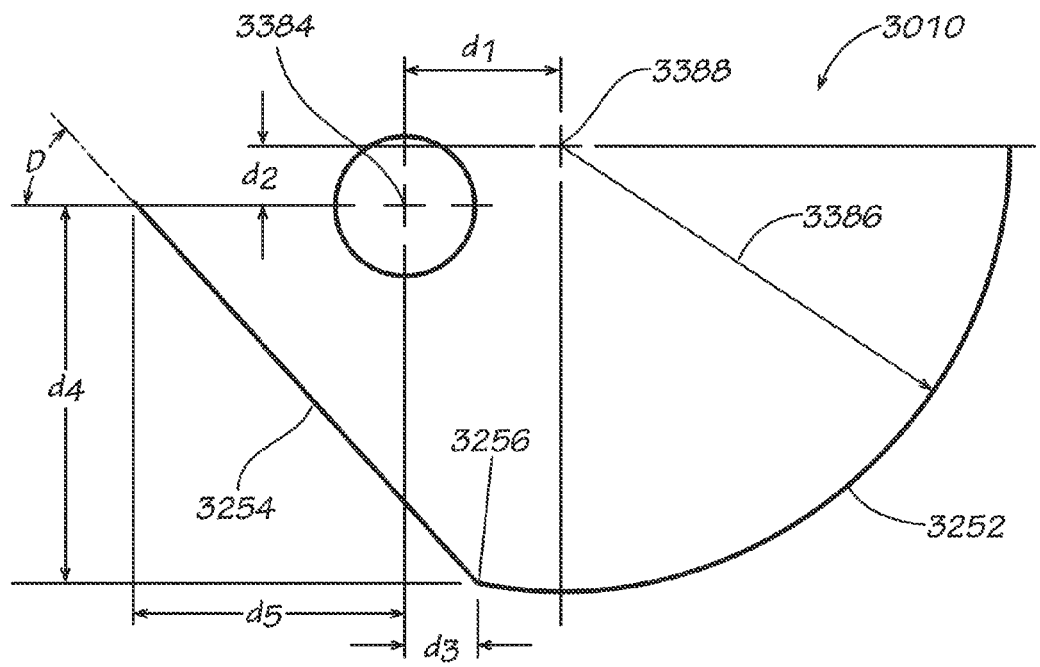
FIG. 17 is a two-dimensional schematic view of a first bearing surface according to the present inventive concept.
Figure 18:
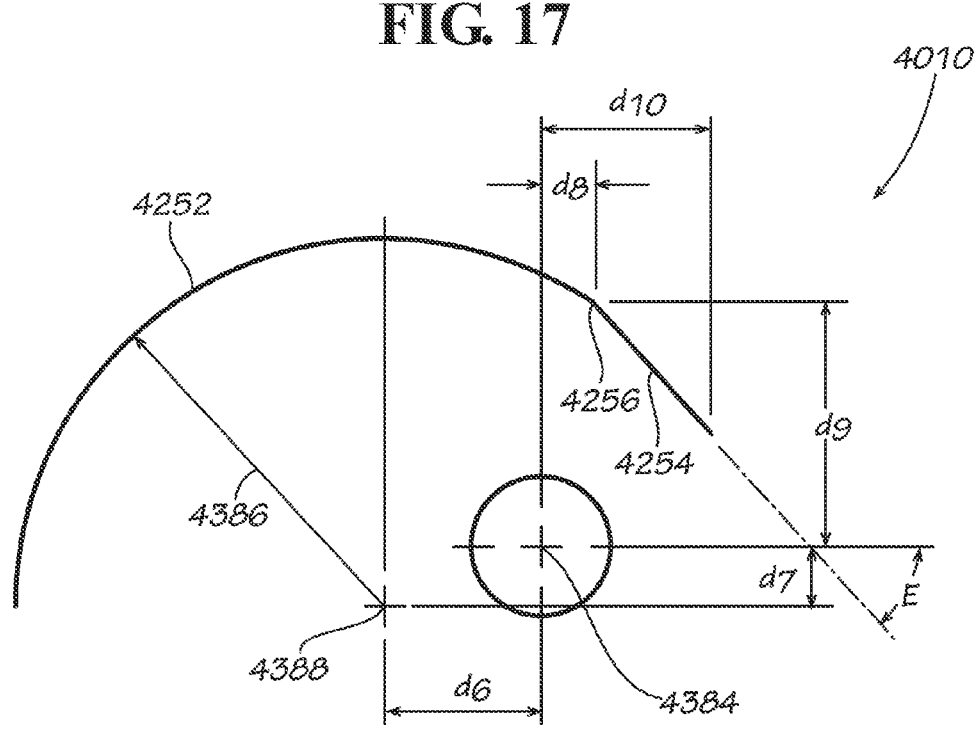
FIG. 18 is a two-dimensional schematic view of a second bearing surface according to the present inventive concept.

Two specific embodiments of bearing surfaces according to the herein described inventive concept will be described below. In these embodiments, various distances $d_1$-$d_{10}$ are described, with some distances given positive values and other distances given negative values. It should be understood that whether the value of a distance given below is positive or negative has no relevance apart from the discussion below with respect to the profiles depicted in FIGS. 17 and 18. With reference only to FIGS. 17 and 18, distances $d_1$-$d_{10}$ are below accorded a positive value if the measurement from a particular point is to the right or upward in the respective Figure, and are accorded a negative value if the measurement from a particular point is to the left or downward in the respective Figure. It should be understood that what is important to a particular bearing surface according to the present inventive concept are the absolute distances and respective arrangement of parts, and not the spatial orientation thereof.

A first embodiment of a bearing surface 3010 is described in FIG. 17. This profile includes a first portion 3252, a second portion 3254, a transition surface 3256 at which the first portion 3252 and the second portion 3254 meet, and a pin location center 3384. In this profile, the first portion 3252 represents an arc of a circle having a curve radius centerpoint 3388 and a radius 3386. In this embodiment, the radius 3386 has a value of 0.800 inches (20.32 mm). The curve radius centerpoint 3388 is separated horizontally from the pin location center 3384 by a distance $d_1$ and vertically by a distance $d_2$. In this embodiment, the distance $d_1$ has a value of 0.275 inches (6.99 mm) and the distance $d_2$ has a value of 0.100 inches (2.54 mm). The transition surface 3256 is separated horizontally from the pin location center 3384 by a distance $d_3$ and vertically by a distance $d_4$. In this embodiment, the distance $d_3$ has a value of 0.131 inches (3.34 mm) and the distance $d_4$ has a value of −0.687 inches (−17.45 mm). The end of the second portion 3254 is separated horizontally from the pin location center 3384 by a distance $d_5$. In this embodiment, the distance $d_5$ has a value of −0.482 inches (−12.24 mm). An angle D is measured between a first line drawn along the second portion 3254 and a second line drawn horizontally through the pin location center 3384. In this embodiment, the angle D is equal to 48.2 degrees. A bearing surface according to this embodiment is incorporated into the extension arm 110 described in detail above.

A second embodiment of a bearing surface 4010 is described in FIG. 18. This profile includes a first portion 4252, a second portion 4254, a transition surface 4256 at which the first portion 4252 and second portion 4254 meet, and a pin location center 4384. In this profile, the first portion 4252 represents an arc of a circle having a curve radius centerpoint 4388 and a radius 4386. In this embodiment, the radius 4386 has a value of 0.650 inches (16.51 mm). The curve radius centerpoint 4388 is separated horizontally from the pin location center 4384 by a distance $d_6$ and vertically by a distance $d_7$. In this embodiment, the distance $d_6$ has a value of −0.275 inches (−6.99 mm) and the distance $d_7$ has a value of −0.100 inches (−2.54 mm). The transition surface 4256 is separated horizontally from the pin location center 4384 by a distance $d_8$ and vertically by a distance $d_9$. In this embodiment, the distance $d_8$ has a value of 0.093 inches (2.37 mm) and the distance $d_9$ has a value of 0.436 inches (11.07 mm). The end of the second portion 4254 is separated horizontally from the pin location center 4384 by a distance $d_{10}$. In this embodiment, the distance $d_{10}$ has a value of 0.299 inches (7.59 mm). An angle E is measured between a first line drawn along the second portion 4254 and a second line drawn horizontally through the pin location center 4384. In this embodiment, the angle E is equal to 48.2 degrees. A bearing surface according to this embodiment is incorporated into the extension arms 1110, 2110 described in detail below.

It should be understood that, while the embodiments shown in FIGS. 17 and 18 have transition surfaces 3256, 4256 that approximate edges, the transition surfaces 3256, 4256 in these embodiments may be of any suitable shape such that wear on the cable is minimized as the articulating portion of the arm is rotated throughout its range of angular positions. For example, the transition surfaces 3256, 4256 could be in the shape of a geometric arc of a circle, or any other curve shape, within the scope of this invention.

Figure 6:
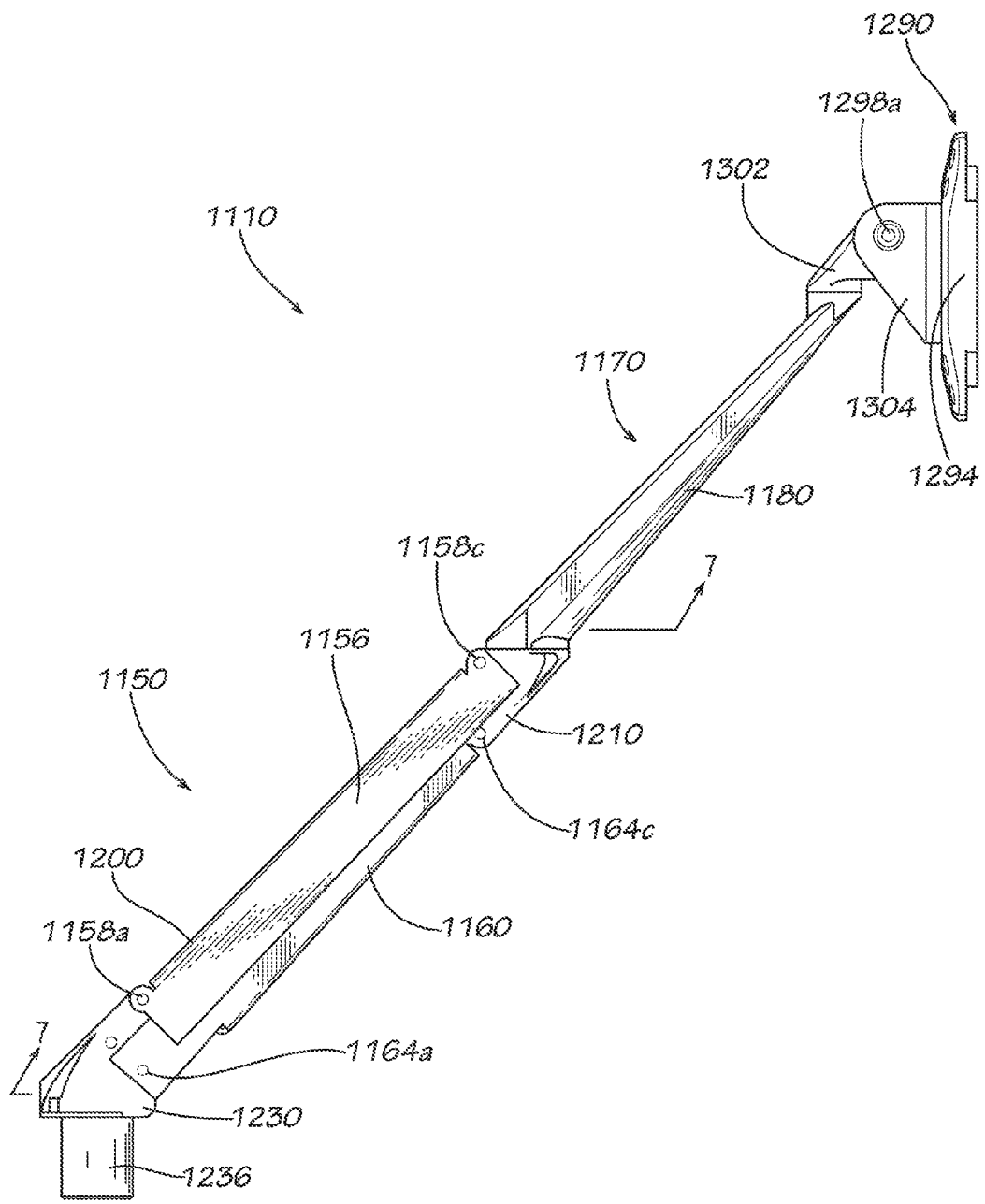
FIG. 6 is a side view of a second embodiment of an extension arm in accordance with the present inventive concept.
Figure 7:
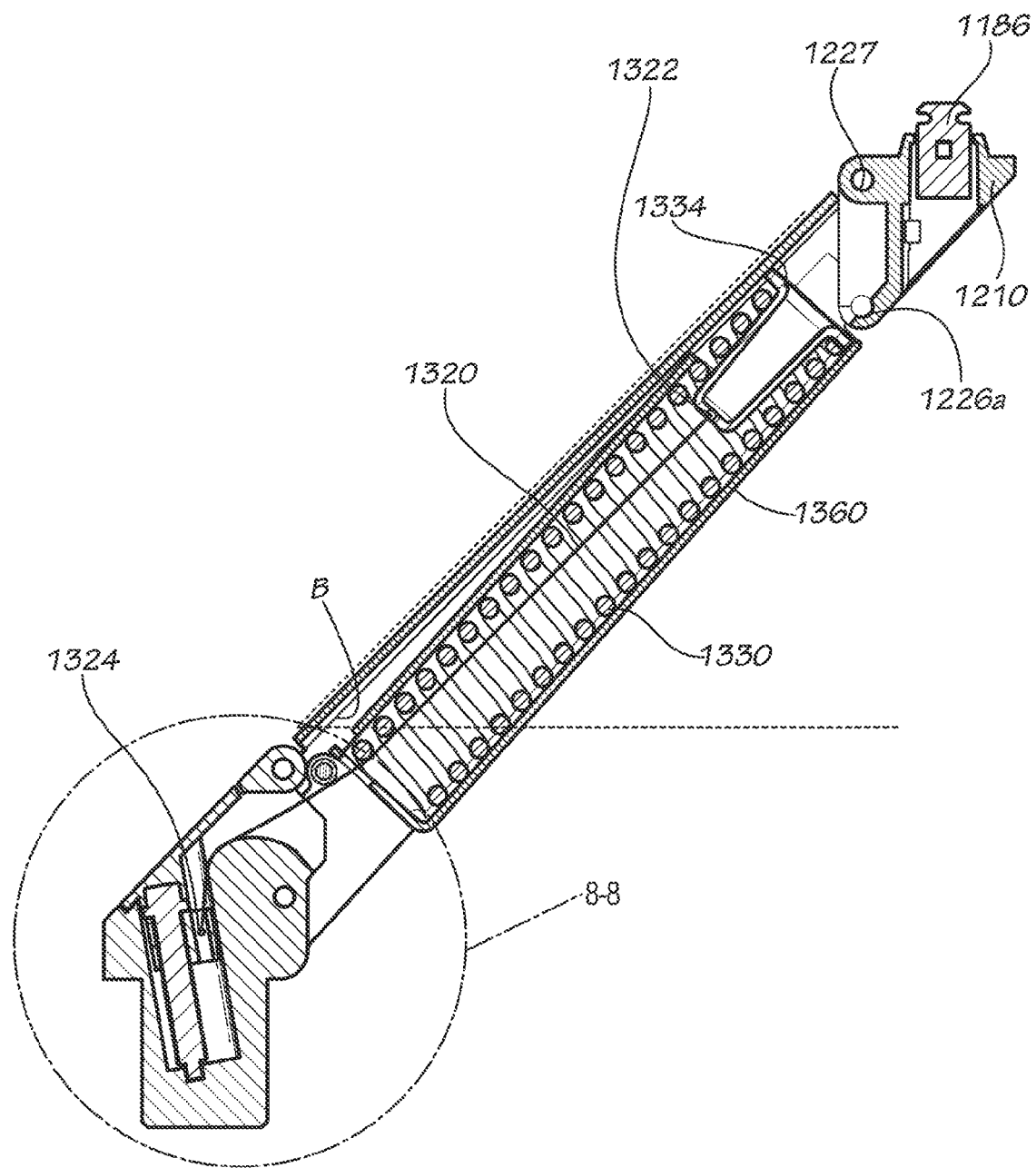
FIG. 7 is a sectional view taken along line 7-7 of FIG. 6.
Figure 8:
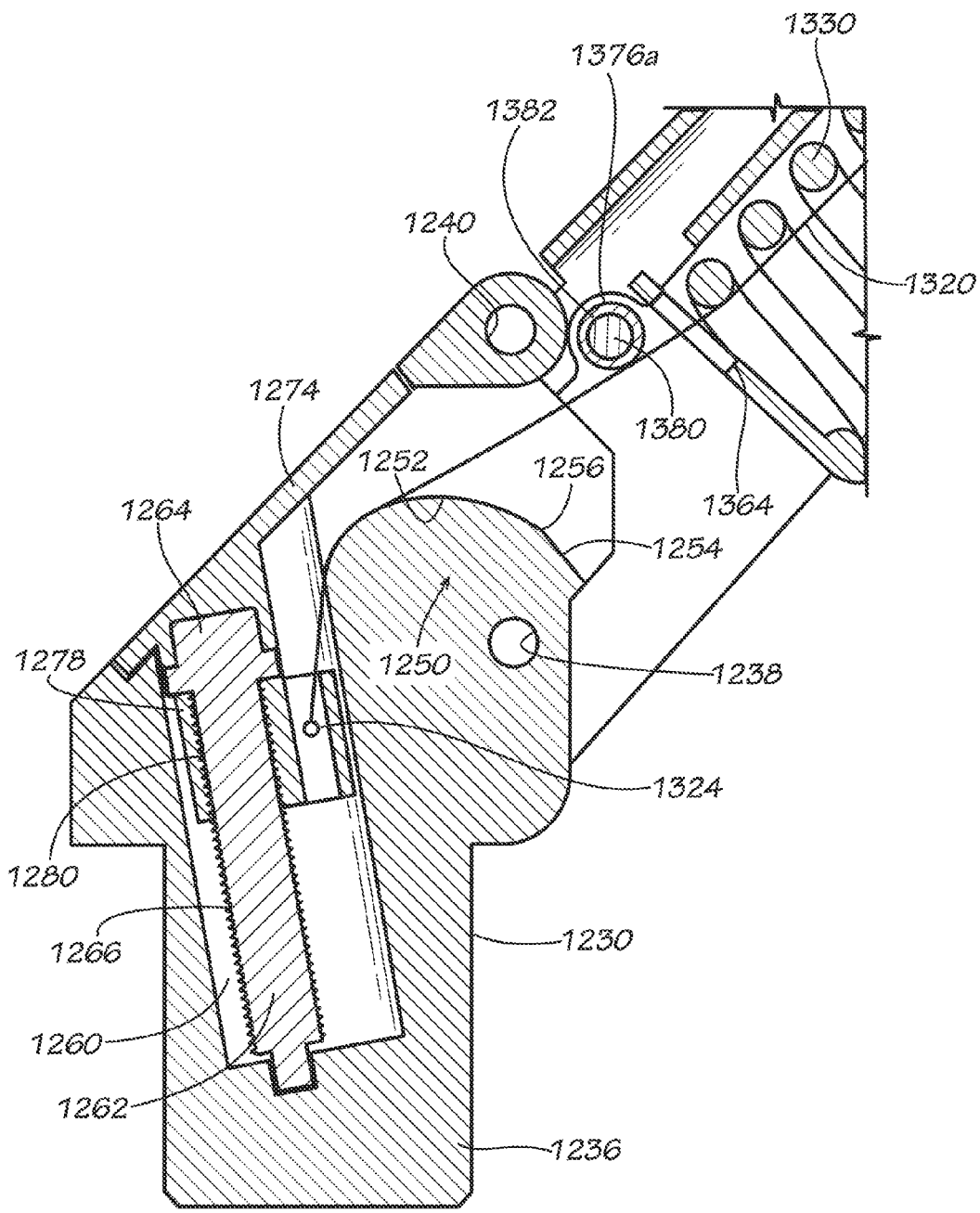
FIG. 8 is an enlarged partial view of area 8-8 of FIG. 7.

FIGS. 6-8 depict a second embodiment of an extension arm 1110 in accordance with the present inventive concept. In this embodiment, elements shared with the first embodiment (extension arm 110) are represented by reference numerals increased by factors of 1000. For example, the lower arm 150 in FIG. 1 corresponds to the lower arm 1150 in FIG. 6.

The extension arm 1110 comprises an endcap 1230, a lower arm 1150, an endcap 1210, an upper arm 1170, and a device mount 1290. The endcap 1230 includes a shaft 1236 which may be attached to, for example, a base portion (not shown) or support mount (not shown). The shaft 1236 may be fitted into, for example, a shaft holder of a mounting bracket (not shown) which has been arranged in any number of various configurations, such as those disclosed in U.S. Pat. No. 7,096,560, issued Aug. 29, 2006 and entitled "METHOD OF MAKING A CONFIGURABLE MOUNT," the disclosure of which is incorporated herein by reference as if fully set forth.

The lower arm 1150 comprises an upper channel member 1156 and a lower channel member 1160. In this embodiment, the upper arm 1170 is a solid forearm 1180. The forearm 1180 and endcap 1210 are substantially similar to the design of the forearm and an endcap disclosed in U.S. Pat. No. 7,540,457, issued Jun. 2, 2009 and entitled "ANGLED MINI ARM HAVING A CLEVIS ASSEMBLY," the disclosure of which is incorporated herein by reference as if fully set forth. The forearm 1180 is pivotably connected to the endcap 1210 via a forearm shaft 1186 (see FIG. 7). In this embodiment, the device mount 1290 comprises a tilter body 1302 a tilter U-plate 1304, and an adapter plate 1294. A tilter pin (not shown), about which the tilter U-plate 1304 is rotatable with respect to the tilter body 1392, is concealed from view by a pair of tilter pin caps (1298a shown; an additional tilter pin cap not shown). It should be understood that any of the various tilter devices which are herein described or disclosed in one of the references which has been incorporated herein are suitable in place of the device mount 1290 in this embodiment.

In alternative embodiments, one or more device cable clips (not shown) could be included on or near endcap 1230, lower arm 1150, endcap 1210, upper arm 1170, and/or device mount 1290 for supporting and concealing a device cable.

In this embodiment, the lower arm 1150 is an articulating portion 1200, as that term is defined above. In FIGS. 6-8, the articulating portion 1200 is shown in a first angular position, which in this embodiment represents the maximum positive angular position of the articulating portion 1200. Articulating portion angle B, which is measured between a first line drawn parallel to the top of the upper channel member (i.e. along the top surface of the upper channel member 1156) and a second line drawn parallel with horizontal, represents a measurement of the angular position of the articulating portion 1200 with respect to horizontal. In this embodiment, the angle B is equal to +45 degrees from horizontal. It should be understood that the articulating portion 1200 is capable of being adjusted through a range of angular positions from the maximum positive angular position down through a horizontal angular position and further to a maximum negative angular position, which in this embodiment would correspond with a measurement of −45 degrees for angle B. It should be further understood that, in other embodiments, the angular range of the articulating portion 1200 may be greater or lesser than the above-noted angular range, have greater or lesser absolute values for its maximum positive and maximum negative angular positions, or have maximum positive and maximum negative angular positions with absolute values that are not equal.

Referring now to FIGS. 7 and 8, the parts and functionality of the articulating portion 1200 will be described in greater detail. The articulating portion 1200 includes a box 1360 which encloses a spring 1330. In this embodiment, the box 1360 is an integral part of the lower channel member 1160. At an end of the box 1360 adjacent to the endcap 1230, the box includes a cable hole 1364 through which a cable 1320 passes. In this embodiment, the cable 1320 is connected at a first cable connection point 1322 corresponding with a spring retainer 1334, which in this embodiment is coupled to a corresponding end of the spring 1330.

In this embodiment, the upper channel member 1156 is attached to the endcap 1230 by placing the pin holes (1158*a* shown; an additional pin hole not shown) located on the upper channel member 1156 adjacent to and outside of the pin slot 1240 located on the endcap 1230, inserting a pin (not shown) through said pin holes (1158*a* or additional pin hole) and said pin slot 1240, and then securing the pin in place. Washers (not shown) may be placed on either or both sides of the endcap 1230 between the respective opening of the pin slot 1240 and the corresponding pin hole (1158*a* or additional pin hole) on the upper channel member 1156. The upper channel member 1156 is attached to the endcap 1210 by placing the pin holes (1158*c* shown; an additional pin hole not shown) located on the upper channel member 1156 adjacent to and outside of the pin slot 1227 located on the endcap 1210, inserting a pin (not shown) through the pin holes (1158*c* or additional pin hole) and the pin slot 1227, and then securing the pin in place. Washers (not shown) may be placed on either or both sides of the endcap 1210 between the respective opening of the pin slot 1227 and the corresponding pin hole (1158*c* or additional pin hole).

In this embodiment, the lower channel member 1160 is attached to the endcap 1230 by placing the pin holes (1164*a* shown; an additional pin hole not shown) located on the lower channel member 1160 adjacent to and outside of the pin slot 1238 located on the endcap 1230, inserting a pin (not shown) through said pin holes (1164*a* or additional pin hole) and said pin slot 1238, and then securing the pin in place. Washers (not shown) may be placed on either or both sides of the endcap 1230 between the respective opening of the pin slot 1238 and the corresponding pin hole (1164*a* or additional pin hole). The lower channel member 1160 is attached to the endcap 1210 by placing the pin holes (1164*c* shown; an additional pin hole not shown) located on the lower channel member 1160 adjacent to and outside of the respective pin holes (1226*a* shown; an additional pin hole not shown) located on the endcap 1210, inserting a pin (not shown) through said four pin holes, and then securing the pin in place. Washers (not shown) may be placed on either or both sides of the endcap 1210 between the opening of the respective pin hole (1226*a* or additional pin hole) and the corresponding pin hole (1164*c* or additional pin hole) on the lower channel member 1160. It should be understood that any of the pins noted above could be replaced with other known parts which permit a rolling function, for example various types of fasteners (including but not limited to rivets, screws, and bolts), stalks, stems, rods, shafts, or pivot members.

A roller pin 1380 is inserted into roller pin holes (1376*a* shown; an additional roller pin hole not shown) located on the box 1360. Cable roller 1382, which has a tubular shape with open ends, is placed around the roller pin 1380 in between the sidewalls of the box 1360. The cable roller 1382 is permitted to rotate around the outer surface of the roller pin 1380 in order to reduce the amount of friction that is applied to the cable 1320 by the moving components of the articulating portion 1200 and to reduce wear on the cable 1320.

As best seen in FIGS. 7 and 8, in this embodiment, the cable 1320 is connected to a first cable connection point 1322 that corresponds with the spring retainer 1334. The cable 1320 is routed from the first cable connection point 1322, through the interior of the spring 1330 and the cable hole 1364 located in the box 1360 and into the interior of the endcap 1230. In the angular position of the articulating portion 1200 depicted in FIGS. 6-8, the cable 1320 comes in contact with the cable roller 1382. Inside the endcap 1230, the cable 1320 is connected to a clevis nut 1278 at a second cable connection point 1324. The clevis nut 1278 is attached to an adjustable clevis bolt 1262 within a clevis slot 1260. The clevis bolt 1262 has a threaded portion 1266 and a head 1264. The head 1264 may be slotted for the accommodation of an adjustment tool, as noted above with respect to the head 264 of the clevis bolt 262 of the first embodiment. The clevis nut 1278 has a threaded interior or clevis-bolt engaging portion 1280, and an outer surface (not labeled) which is slidable within the clevis slot 1260.

In this embodiment, the clevis bolt 1262 is held in a captive position by the design of the clevis slot 1260 and a clevis bolt cover 1274 which overlays the clevis bolt 1262. As the head 1264 of the clevis bolt 1262 is rotated, the clevis nut 1278 moves up or down along the length of the threaded portion 1266 of the clevis bolt 1262 within the clevis slot 1260, similarly to how the clevis bolt 262 of the first embodiment of the extension arm 110 interacts with the clevis nut 278 thereof. Because the cable 1320 is fixedly attached at the second cable connection point 1324 located within the clevis nut 1278, movement of the clevis nut 1278 in a downward direction places additional tension along the length of the cable 1320. As a result, the cable 1320 pulls on the spring retainer 1334 at the first cable connection point 1322, thereby compressing the spring 1330. As the spring 1330 compresses, the restorative force generated by the compressed spring 1330 acts in a direction towards the first cable connection point 1322 (due to the spring 1330 being pressed against a solid wall of the box 1360 at the end opposing the first cable connection point 1322), and said restorative force is thus transferred to the cable 1320 via the spring retainer 1334. The cable 1320 thus supplies additional force to the articulating portion 1200 (and by extension any components connected thereto, including the upper arm 1170, device mount 1290, and, and any attached user device). In the above fashion, the articulating portion 1200 may be adjusted to accommodate user devices of various masses without the need for replacing any of the components of the articulating portion 1200.

In this embodiment, the cable 1320 is routed about a bearing surface 1250, which comprises a first portion 1252, a second portion 1254, and a transition surface 1256 at which the first portion 1252 and the second portion 1254 meet. In this embodiment, the first portion 1252 is a curved surface and the second portion 1254 is a linear surface when viewed in cross-section. Although in this embodiment the second portion 1254 is a linear surface for ease of molding, the second portion 1254 could be of any possible shape such that the cable 1320 avoids contact with the second portion 1254 as the articulating portion 1200 is moved from a horizontal position down towards its maximum negative angular position. As the articulating portion 1200 is moved through its full range of angular positions, the interaction of the cable 1320 with the bearing surface 1250 is substantially identical to the interaction of the cable 320 of the first embodiment with the bearing surface 250 thereof, said interaction being explained in detail above.

FIGS. 9, 10A, and 11-16 depict a third embodiment of an extension arm 2110 in accordance with the present inventive concept. In this embodiment, elements shared with the first and second embodiments (extension arms 110, 1110) are represented by reference numerals increased by factors of 1000 respectively therefrom. For example, the lower arm 150 in FIG. 1 and the lower arm 1150 in FIG. 6 correspond to the lower arm 2150 in FIG. 9.

The extension arm 2110 comprises a support mount 2112 having a first bracket component or clamp 2114, a base portion 2120, a lower arm 2150, an endcap 2210, an upper arm 2170, and a device mount 2290. In this embodiment, the first bracket component 2114 is approximately U-shaped in cross section, and includes a threaded hole (not shown) in its lower portion through which a threaded rod (not shown) may be fitted. The threaded rod may be adjusted to change a support thickness of the support mount 2112. It should be understood that the support mount 2112 could be replaced with any known support mount within the scope of the present disclosure, for example any of the devices disclosed in the reference noted above which has been incorporated herein by reference. In this embodiment, the device mount 2290 includes a tilter body 2302 connected to a tilter U-plate 2304, and a rotating plate 2316. In this embodiment, it should be understood that any of the various tilter devices which are herein described or disclosed in one of the references which has been incorporated herein are suitable in place of the device mount 2290.

In this embodiment, the upper arm 2170 is a solid forearm 2180. The forearm 2180 and endcap 2210 are substantially similar to the design of the forearm 1180 and endcap 1210 described with respect to the second embodiment of the extension arm 1110 noted above. The forearm 2180 is pivotably connected to the endcap 2210 via a forearm shaft 2186 (see FIG. 10A). The base portion 2120 includes a base plate 2122, the bottom surface of which is adapted to come into contact with a support surface (not shown). In this embodiment, the first bracket component 2114 is inserted into and retained within the base plate 2122. The base portion 2120 further includes a tube insert 2136, and an endcap 2230. As described in further detail below, a device cable cover 2132 with a hollow body and open ends is releasably attached to the endcap 2230. The device cable cover 2132 is adapted to accommodate passage of a device cable (not shown) therethrough so that the device cable is substantially hidden from view throughout the base portion 2120 of the extension arm 2110. In this embodiment, the device cable cover 2132 has a solid exterior. In alternative embodiments, the device cable cover 2132 may include perforations therein (not shown). In further alternative embodiments, one or more device cable clips (not shown) could be included on or near base portion 2120, endcap 2210, endcap 2230, forearm 2180, and/or device mount 2290 for supporting and concealing a device cable. These device cable clips may alternatively include similar perforations.

Figure 9:
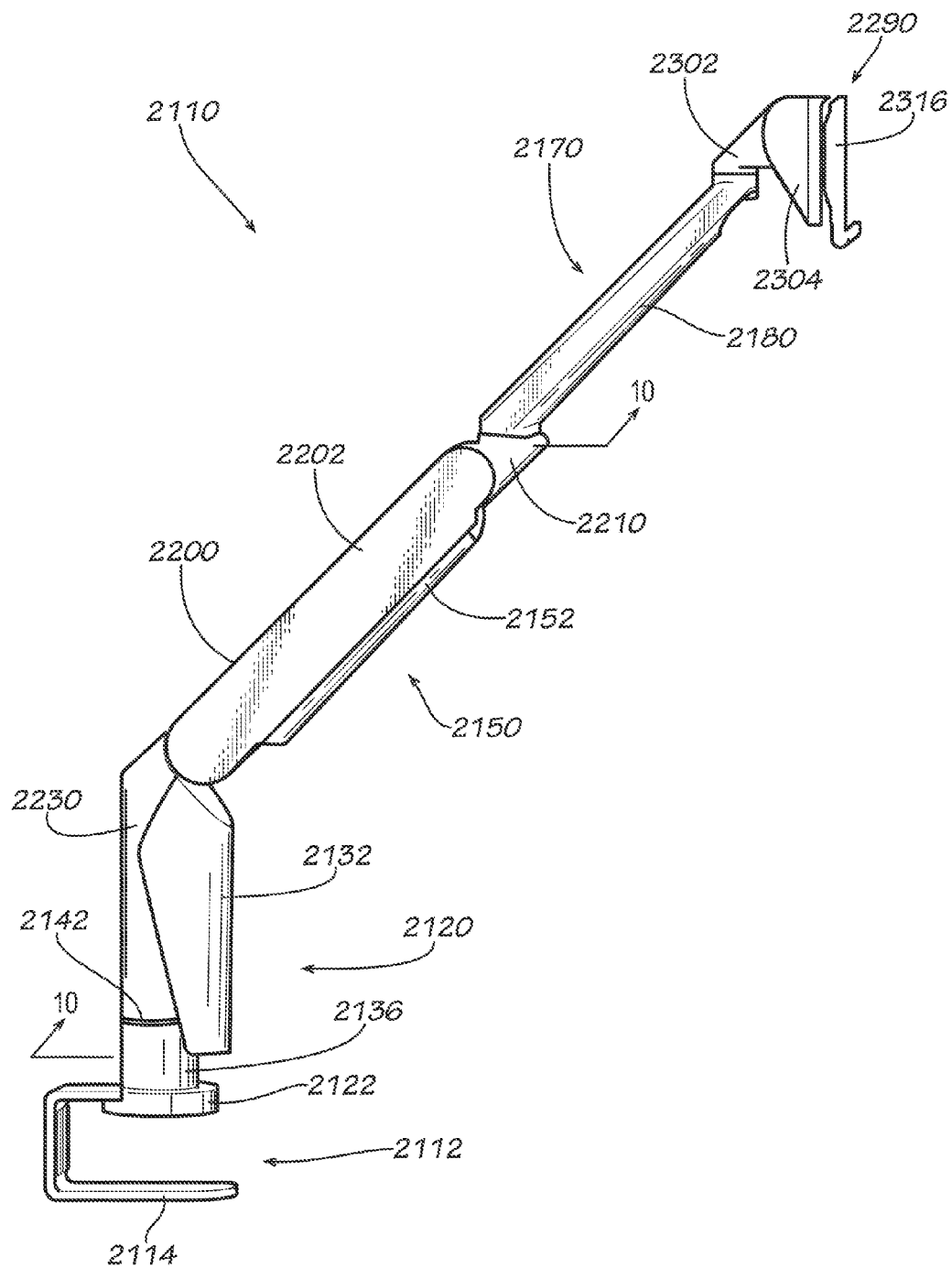
FIG. 9 is a side view of a third embodiment of an extension arm in accordance with the present inventive concept.
Figure 10A:
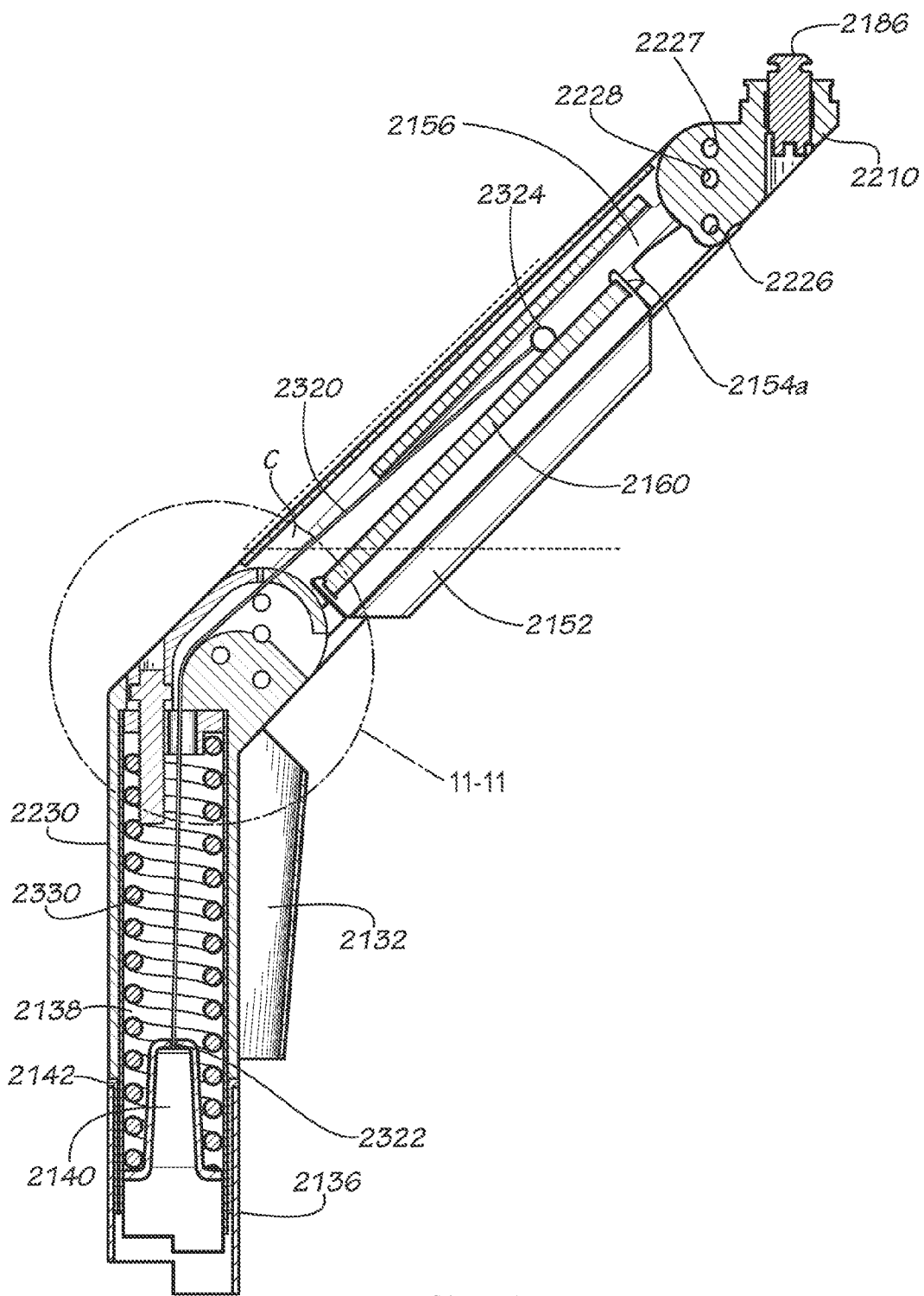
FIG. 10A is a sectional view taken along line 10-10 of FIG. 9.
Figure 11:
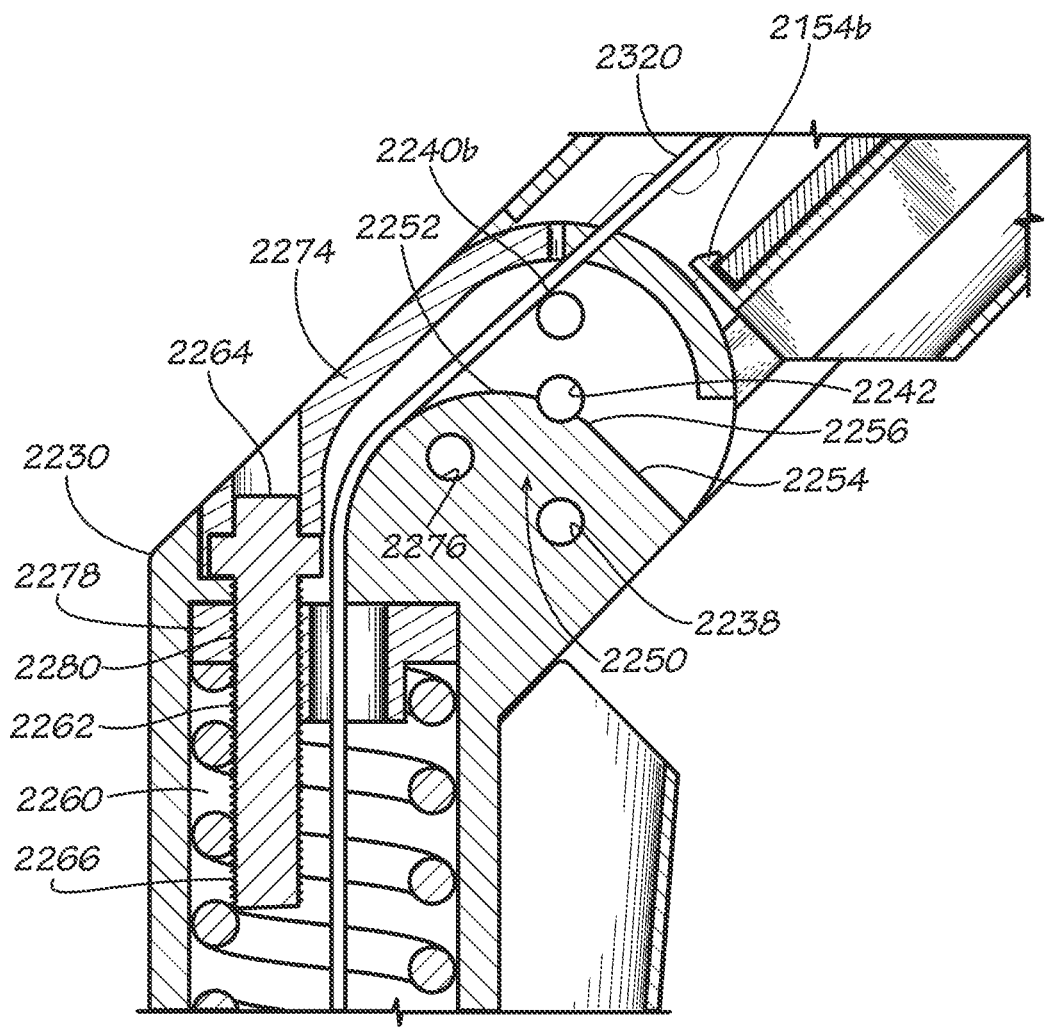
FIG. 11 is an enlarged partial view of area 11-11 of FIG. 10A.

In this embodiment, the lower arm 2150 is an articulating portion 2200, as that term is defined above. In FIGS. 9, 10A, and 11, the articulating portion 2200 is shown in a first angular position, which in this embodiment represents the maximum positive angular position of the articulating portion 2200. Articulating portion angle C, which is measured between a first line drawn parallel to the top of the upper channel member (i.e. along the top surface of an articulating portion cover 2202) and a second line drawn parallel with horizontal, represents a measurement of the angular position of the articulating portion 2200 with respect to horizontal. In this embodiment, the angle C is equal to +45 degrees from horizontal. It should be understood that the articulating portion 2200 is capable of being adjusted through a range of angular positions from the maximum positive angular position down through a horizontal angular position and further to a maximum negative angular position, which in this embodiment would correspond with a measurement of −45 degrees for angle C. It should be further understood that, in other embodiments, the angular range of the articulating portion 2200 may be greater or lesser than the above-noted angular range, have greater or lesser absolute values for its maximum positive and maximum negative angular positions, or have maximum positive and maximum negative angular positions with absolute values that are not equal.

Referring now to FIGS. 10A and 11-13, the parts and functionality of the base portion 2120 and the articulating portion 2200 will be described in greater detail. In this embodiment, the base portion 2120 includes the tube insert 2136, which rests partially within the base plate 2122. A bushing 2142 having a bushing lip 2144 (see FIG. 13) rests substantially within the inside of the tube insert 2136 (the bushing lip 2144 is visible in FIG. 9). The bushing 2142 permits the extension arm 2110 to be rotated about an axis drawn vertically through the center of the tube insert 2136 as shown in FIGS. 9 and 10A. A spring tube 2138 is inserted partially within the interior of the bushing 2142. The spring tube 2138 partially retains a spring 2330. At the bottom of the spring 2330 is located a spring retainer 2140, which will be discussed in greater detail below. The shaft 2236 of the endcap 2230 is located substantially around the spring tube 2138 and rests on an upper surface of the lip 2144 of the bushing 2142. It should be understood that, in alternative embodiments, the bushing 2142 could include a slot therein for permitting passage of a device cable therethrough.

Figure 10B:
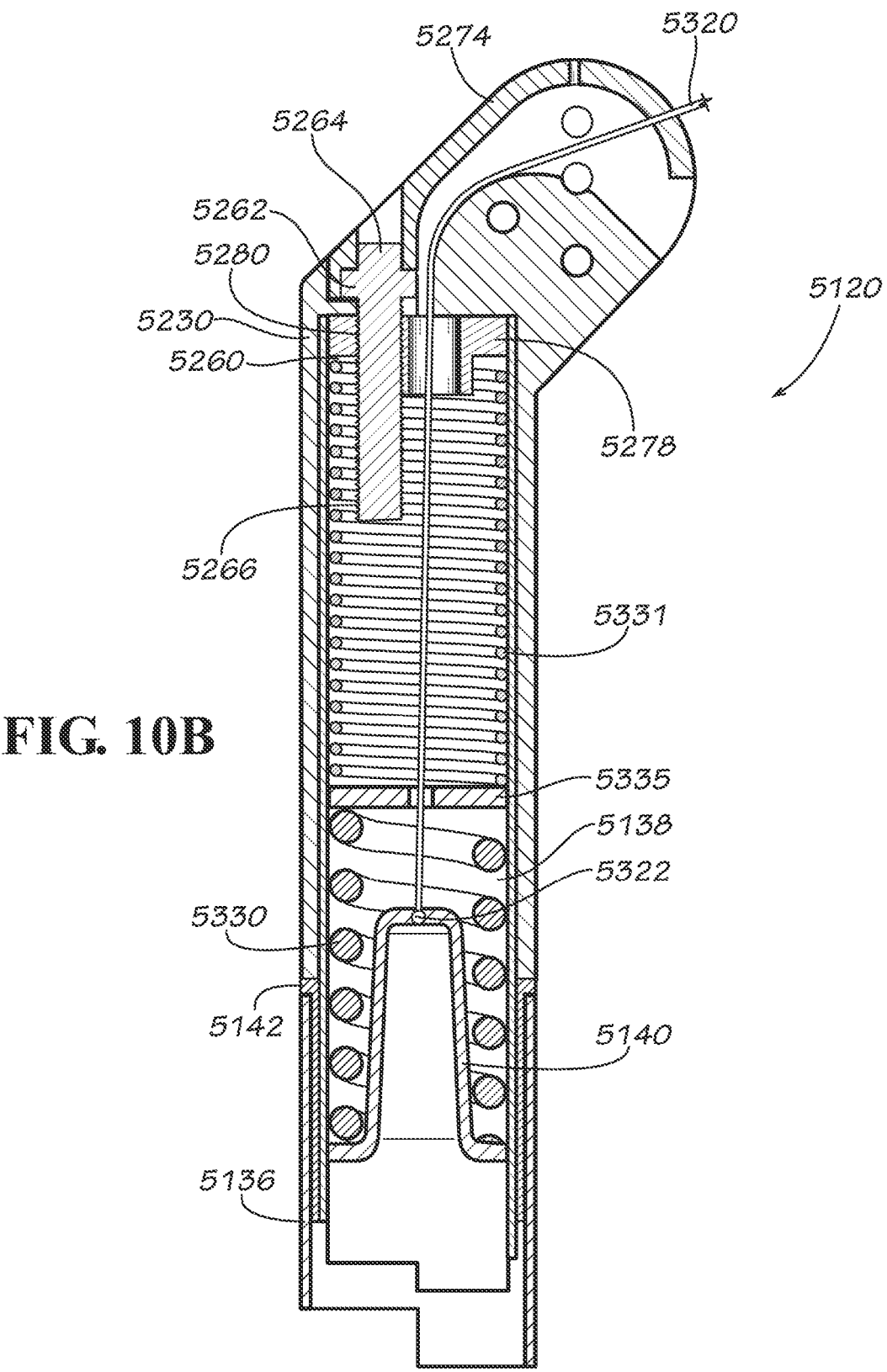
FIG. 10B is a enlarged partial view of a fourth embodiment of a base portion in accordance with the present inventive concept.

An alternative embodiment of a base portion 5120 is shown in FIG. 10B. In this embodiment, elements shared with the base portion 2120 of the third embodiment are represented by reference numerals increased by factors of 3000 respectively therefrom. For example, the endcap 2230 in FIG. 10A corresponds to the endcap 5230 in FIG. 10B.

In this embodiment, the base portion 5120 is substantially identical to the base portion 2120 of the third embodiment of the extension arm 5110, with the exception of the spring assembly, which will be described in further detail below. In this embodiment, a first spring 5330 and a second spring 5331 are located within a spring tube 5138 and are separated by a spring separator 5335, which is free to move within the spring tube 5138. In this embodiment, the spring separator 5335 approximates a flat washer with a hole (not labeled) at the center thereof to permit passage of a cable 5320 therethrough. In further alternative embodiments, the spring separator 5335 may be of any suitable shape so as to remain properly oriented (i.e. transverse to the path of the cable 5320 as shown in FIG. 10B) while staying firmly in contact with both the first spring 5330 and the second spring 5331, for example the shape of a pair of spring retainers 5140 with the respective flat ends thereof in contact with another.

In this embodiment, the first spring 5330 and second spring 5331 are cylindrical compression springs having different spring rates from another. In this embodiment, the first spring 5330 has a greater spring rate than the second spring 5331. It should be understood that the arrangement of the first spring 5330 and the second spring 5331 could alternatively be reversed. In further alternative embodiments, the first spring 5330 and/or the second spring 5331 may be of non-cylindrical shape, for example conical, barrel, or hour-glass shape. These non-cylindrical spring types typically have a non-constant spring rate, and therefore could be used to generate non-constant amounts of restorative force as the spring is compressed a unit distance. For example, it may take 100 pounds (45.36 kg) of mass to compress a particular conical spring from its equilibrium state to a compressed state of one inch (2.54 cm) (measured from equilibrium), but 150 pounds (68.04 kg) of mass to compress the same spring from a compression state of once inch (2.54 cm) to a compression state of two inches (5.08 cm). To more effectively accommodate devices of varying ranges of masses, either the first spring 5330 or the second spring 5331 could optionally be pre-loaded so as to generate a desired baseline restorative force therein, for example by movement of a clevis bolt 5278 within a clevis slot 5260 in an upward or downward direction as shown in FIG. 10B based on adjustment of a clevis bolt 5262. In this embodiment, if the user desires to accommodate a lower range of masses, the second spring 5331 would not be pre-compressed, or would be pre-compressed a small amount, so that the combined restorative force of the first spring 5330 and the second spring 5331 supplied to the spring retainer 5140 (and thereby the cable 5320 at a first cable connection point 5322) is kept small. Conversely, if the user desires to accommodate a higher range of masses, the second spring 5331 would be pre-compressed a greater amount (for example so that the restorative force generated by the second spring 5331 is the same as the restorative force generated by the first spring 5330), so that the combined restorative force of the first spring 5330 and the second spring 5331 supplied to the spring retainer 5140 (and thereby the cable 5320 at the first cable connection point 5322) is increased. In this fashion, the amount of counterbalance force required to be supplied to the articulating portion by friction (for example by the pins joining the articulating portion to the respective endcaps) may be decreased.

Figure 12:
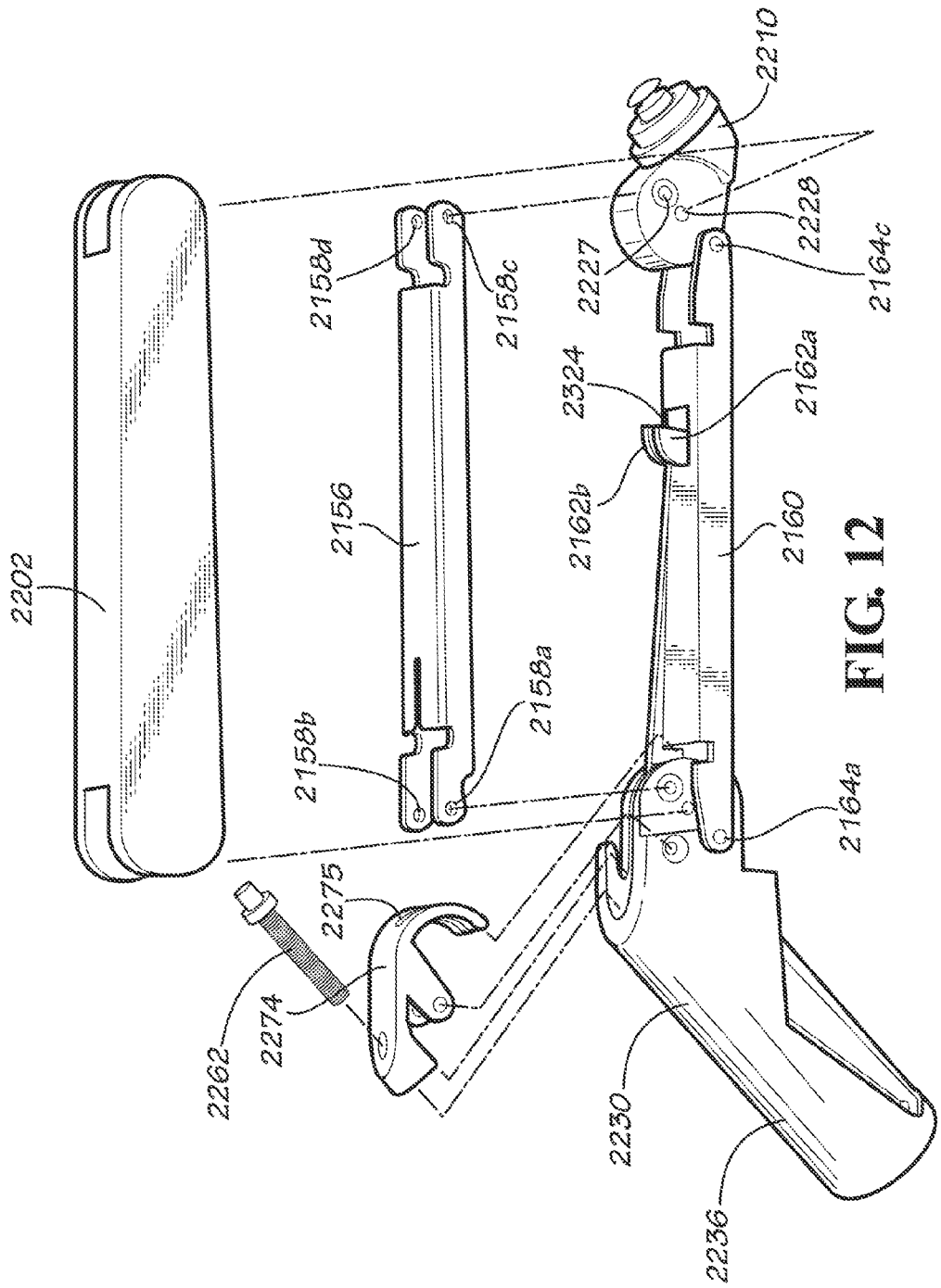
FIG. 12 is a partial exploded view of the components of the lower arm according to the third embodiment.
Figure 13:
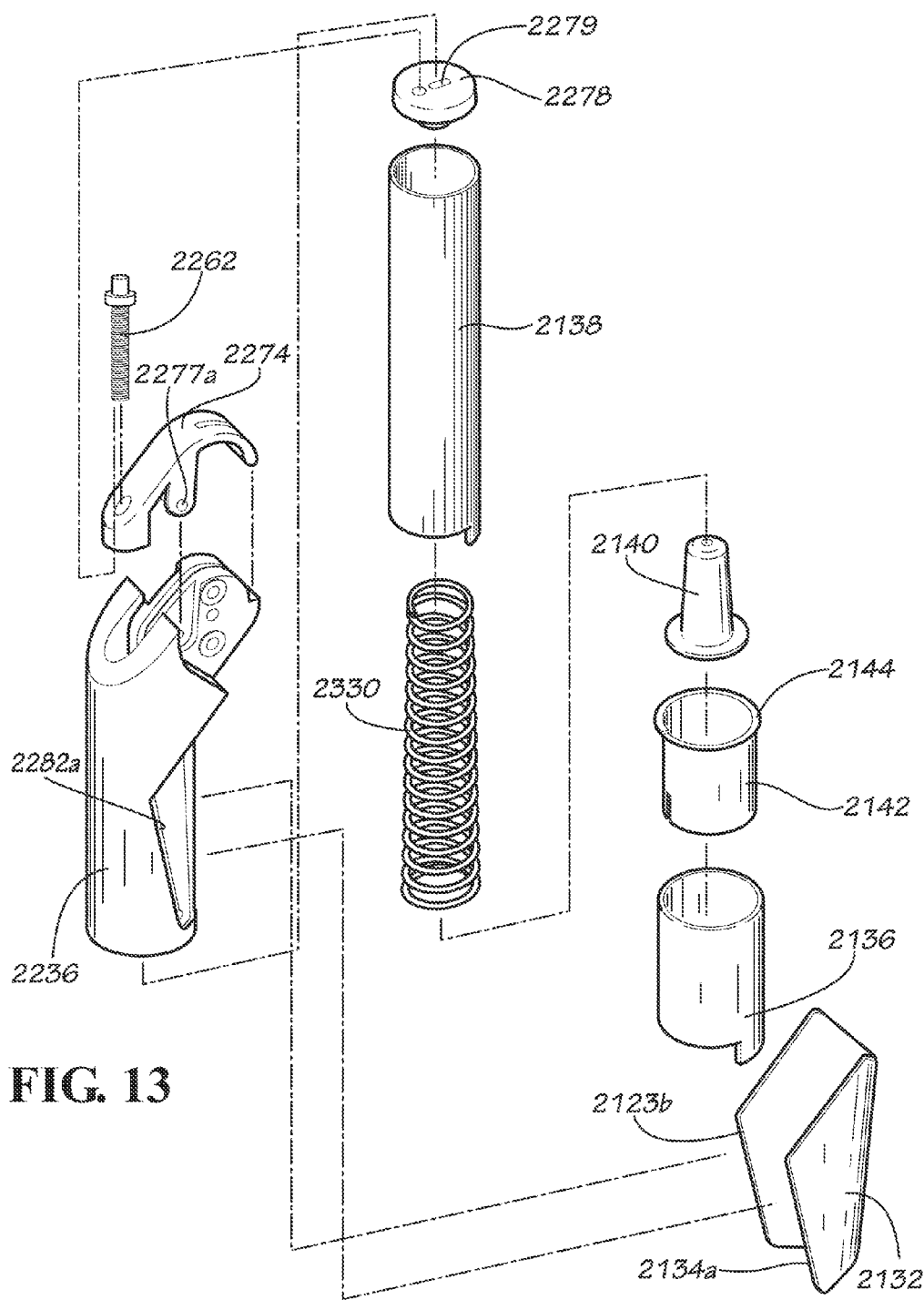
FIG. 13 is a partial exploded view of the components of the base portion according to the third embodiment.

Referring back to the third embodiment of the extension arm 2110, as best seen in FIG. 12, in this embodiment the articulating portion 2200 includes an upper channel member 2156 and a lower channel member 2160. The lower channel member 2160 includes a pair of retaining elements or hooks 2162a, 2162b, which correspond with a second cable connection point 2324. In this embodiment, a cable 2320 is connected at the second connection point 2324 to the hooks 2162a, 2162b by a cable-retaining pin (shown in FIG. 10A but not separately labeled). In an alternative embodiment, the hooks 2162a, 2162b and cable-retaining pin may be omitted from the lower channel member 2160 and the cable 2320 may be retained at the second connection point 2324 by other suitable affixation means, including but not limited to a fastener, fixed washer, wrapping, knotting, or crimping of the cable 2320 about an affixation point (not shown) located on the lower channel member 2160, welding, or a suitable adhesive.

In this embodiment, the upper channel member 2156 is attached to the endcap 2230 by placing the pin holes 2158a, 2158b located on the upper channel member 2156 adjacent to and outside of the respective pin holes 2240a, 2240b (2240a shown in FIG. 12 but not labeled) located on the endcap 2230, inserting a pin (not shown) through said four pin holes, and then securing the pin in place. Washers (not shown) may be placed on either or both sides of the endcap 2230 between the opening of the respective pin hole (2240a or 2240b) and the corresponding pin hole (2158a or 2158b) on the upper channel member 2156. The upper channel member 2156 is attached to the endcap 2210 by placing the pin holes 2158c, 2158d located on the upper channel member 2156 adjacent to and outside of the pin slot 2227 located on the endcap 2210, inserting a pin (not shown) through the pin holes 2158c, 2158d and the pin slot 2227, and then securing the pin in place. Washers (not shown) may be placed on either or both sides of the endcap 2210 between the respective opening of the pin slot 2227 and the corresponding pin hole (2158c or 2158d).

In this embodiment, the lower channel member 2160 is attached to the endcap 2230 by placing the pin holes (2164a shown; an additional pin hole not shown) located on the lower channel member 2160 adjacent to and outside of the pin slot 2238 located on the endcap 2230, inserting a pin (not shown) through said pin holes 2164a, 2164b and said pin slot 2238, and then securing the pin in place. Washers (not shown) may be placed on either or both sides of the endcap 2230 between the respective opening of the pin slot 2238 and the corresponding pin hole (2164a or additional pin hole). The lower channel member 2160 is attached to the endcap 2210 by placing the pin holes (2164c shown; an additional pin hole not shown) located on the lower channel member 2160 adjacent to and outside of the pin slot 2226 located on the endcap 2210, inserting a pin (not shown) through said pin holes (2164c or additional pin hole) and said pin slot 2226, and then securing the pin in place. Washers (not shown) may be placed on either or both sides of the endcap 2210 between the respective opening of the pin slot 2226 and the corresponding pin hole (2164c or additional pin hole) on the lower channel member 2160. It should be understood that any of the pins noted above could be replaced with other known parts which permit a rolling function, for example various types of fasteners (including but not limited to rivets, screws, and bolts), stalks, stems, rods, shafts, or pivot members.

In this embodiment, the articulating portion cover 2202 is attached to the endcap 2230 via a pin (not shown) which is inserted through the pin slot 2242 located in the endcap 2230. In the alternative, the pin slot 2242 and accompanying pin may be replaced with a pair of studs or bosses (not shown) that protrude from the respective sides of the endcap 2230 so as to engage the articulating portion cover 2202 and permit rotation of the cover 2202 thereabout. The articulating portion cover 2202 is attached to the endcap 2210 via a pin (not shown) which is inserted through the pin slot 2228 located on the endcap 2210. In the alternative, the pin slot 2228 and accompanying pin may be replaced with a pair of studs or bosses (not shown) that protrude from the respective sides of the endcap 2210 so as to engage the articulating portion cover 2202 and permit rotation of the cover 2202 thereabout. In this embodiment, a device cable cover 2152 is coupled to the articulating portion 2200 and is adapted to accommodate passage of the device cable therethrough so that the device cable is substantially hidden from view throughout the lower arm 2150 portion of the extension arm 2110. In this embodiment, the device cable cover 2152 is attached to the lower channel member 2160 by a pair of deformable tabs 2154a, 2154b which couple to the lower channel member 2160. In this embodiment, the device cable cover 2152 has a solid exterior. In alternative embodiments, the device cable cover 2152 may include perforations (not shown). In a further alternative embodiment, the device cable cover may include one or more tabs that directly engage one or more slots located in the lower channel member. In this embodiment, the lower channel member may include a recessed bottom surface and a pair of edges descending therefrom, the pair of edges including the one or more slots. In this way, the device cable cover may be partially hidden by the edges of the lower channel when the one or more tabs are installed within the one or more slots, thereby giving the device cable cover a lower profile appearance.

Referring back to the embodiment shown in FIG. 10A, in this embodiment the cable 2320 is connected to a first cable connection point 2322 that corresponds with the spring retainer 2140. The cable 2320 is routed from the first cable connection point 2322, through the interior of the spring 2330, through a cable hole 2279 (see FIG. 13) located on a clevis nut or spring adjuster 2278, through a cable hole 2258 located in the endcap 2230 (see FIG. 15), about a bearing surface 2250, through a cable slot 2275 (see FIG. 12) located in a clevis bolt cover 2274, and then into the articulating portion 2200 where the cable 2320 terminates at the second connection point 2324, as noted above. In this embodiment, the cable 2320 is permitted to come into contact with the pin that is inserted through the pin slot 2242 as the articulating portion 2200 is moved throughout its range of angular positions. In the alternative, said pin could be replaced with a pair of pins of shorter length (similar to the rivet pins 352a, 352b of the first embodiment), so that a gap is created between the medial ends thereof so that the cable 2320 can move freely therebetween without coming in contact with either of said shorter pins.

Inside the base portion 2120, the cable 2320 is connected to the spring retainer 2140 at the first cable connection point 2322. The spring 2330 is held in place and maintained in a linear configuration by the inner walls of the spring tube 2138. The spring retainer 2140 is located at the bottom end of the spring tube 2138 and comes into contact with the bottom end of the spring 2330. The clevis nut 2278 is located at the top end of the spring tube 2138 and comes into contact with the top end of the spring 2330. The spring retainer 2140 and clevis nut 2278 collectively prevent the spring 2330 from becoming removed from the spring tube 2138. The clevis nut 2278 is attached to an adjustable clevis bolt 2262 within a clevis slot 2260, which in this embodiment comprises a portion of the interior of the spring tube 2138. The clevis bolt 2262 has a threaded portion 2266 and a head 2264. The head 2264 may be slotted for the accommodation of an adjustment tool, as noted above with respect to the head 264 of the clevis bolt 262 of the first embodiment. The clevis nut 2278 also has a threaded interior or clevis-bolt engaging portion 2280.

Figure 15:
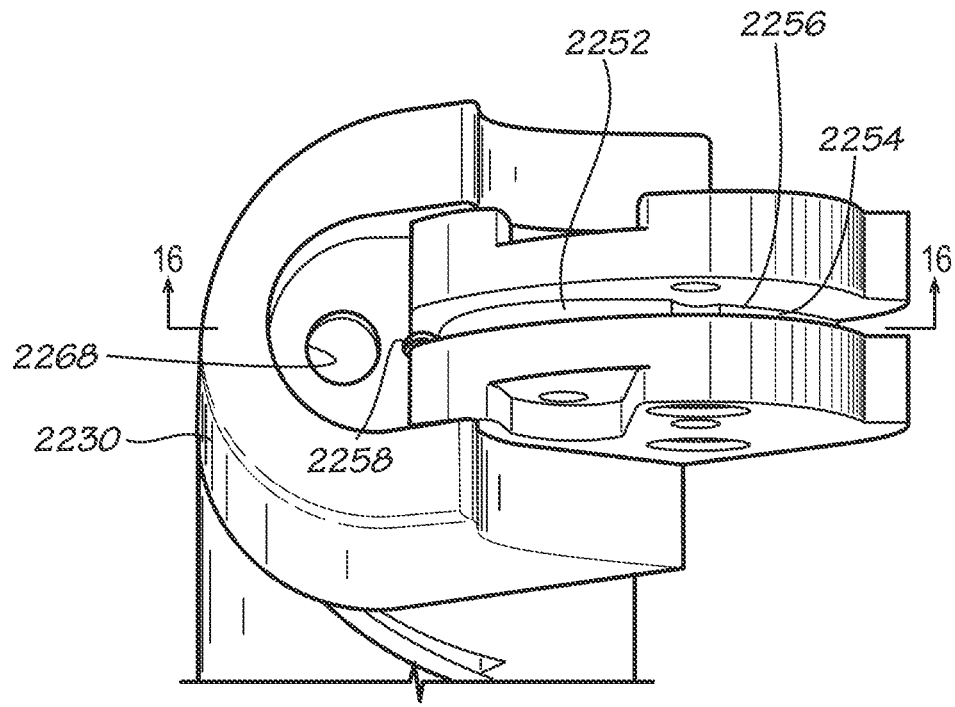
FIG. 15 is a top perspective view thereof.

In this embodiment, the clevis bolt 2262 is held in a captive position by the design of the clevis slot 2260 and the clevis bolt cover 2274 which overlays the clevis bolt 2262. The clevis bolt cover 2274 is coupled to the endcap 2230 by a pin (not shown), which is inserted through the pin holes 2277a, 2277b (2277b not labeled; see FIG. 13) located in the clevis bolt cover 2274 and the pin slot 2276 located in the endcap 2230. As best seen in FIG. 15, the endcap 2230 has a clevis bolt hole 2268 for permitting the threaded portion 2266 of the clevis bolt 2262 to pass therethrough into the clevis slot 2260. As the head 2264 of the clevis bolt 2262 is rotated, the clevis nut 2278 moves up or down along the length of the threaded portion 2266 of the clevis bolt 1262 within the clevis slot 2260, similarly to how the clevis bolt 262 of the first embodiment of the extension arm 110 interacts with the clevis nut 278 thereof. Because the clevis nut 2278 is in contact with the spring 2330, movement of the clevis nut 2278 compresses or decompresses the spring along its length (i.e. in a vertical direction as depicted in FIG. 10A). As the spring compresses, the restorative force generated by the compressed spring 2330 acts outwardly along the length of the spring 2330. Because the clevis nut 2278 is rigidly positioned due to its interaction with the clevis bolt 2262, the restorative force of the spring 2330 acts in a downward direction against the spring retainer 2140. Because the cable 2320 is fixedly attached to the spring retainer 2140 at the first cable connection point 2322, the restorative force is thus substantially transferred to the cable 2320. The cable 2320 thus supplies additional force to the articulating portion 2200 (and by extension any components connected thereto, including the upper arm 2170, device mount 2290, and, and any attached user device). In the above fashion, the articulating portion 2200 may be adjusted to accommodate user devices of various masses without the need for replacing any of the components of the articulating portion 2200.

Figure 14:
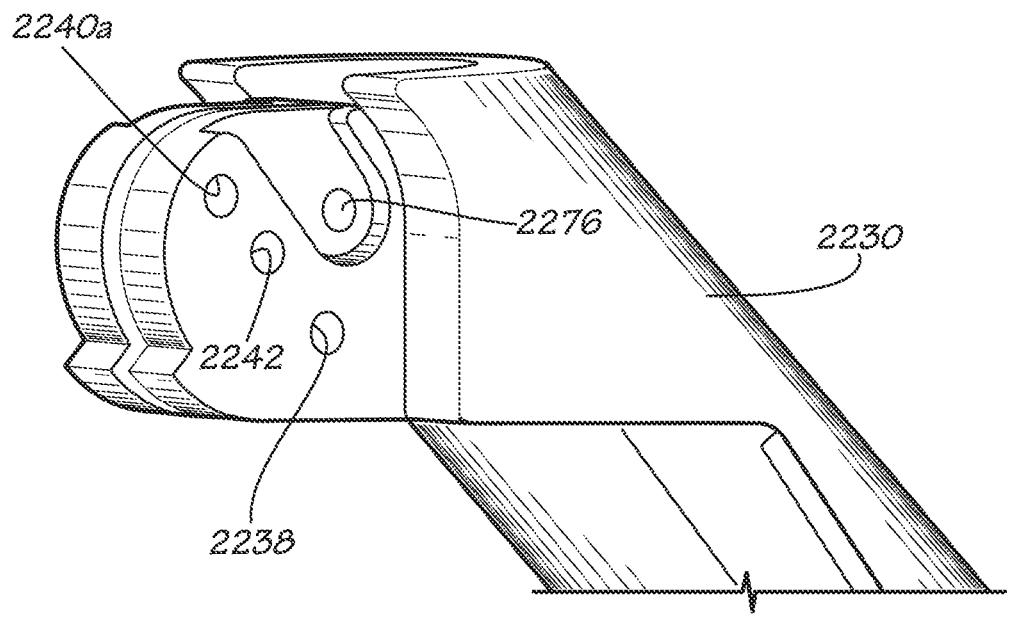
FIG. 14 is a side perspective view of an endcap according to the third embodiment.
Figure 16:
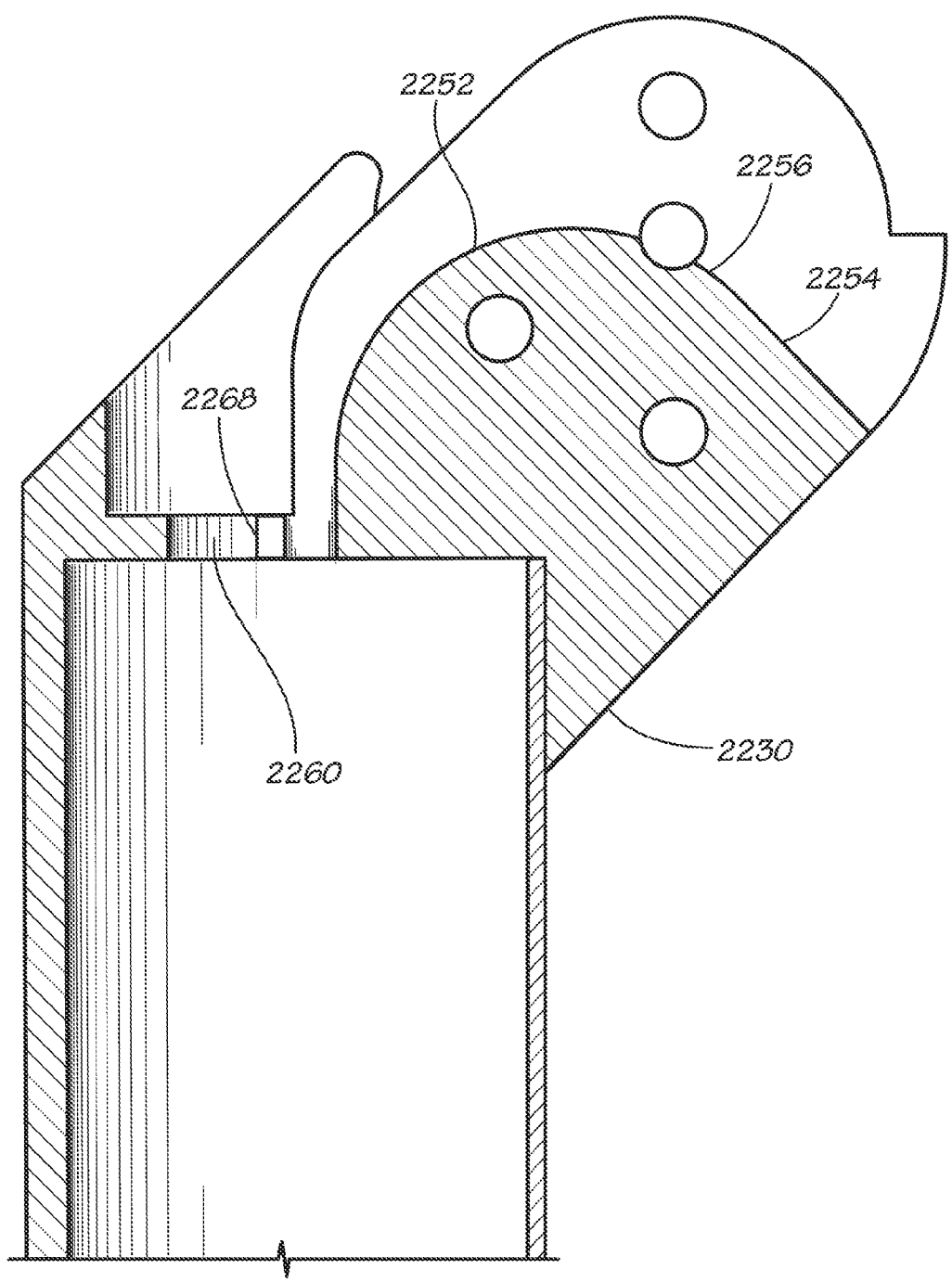
FIG. 16 is a sectional view thereof taken along line 16-16 of FIG. 15.

Additional views of the endcap 2230 are shown in FIGS. 14-16. In this embodiment, the cable 2320 is routed about the bearing surface 2250, which comprises a first portion 2252, a second portion 2254, and a transition surface 2256 at which the first portion 2252 and the second portion 2254 meet. In this embodiment, the first portion 2252 is a curved surface and the second portion 2254 is a linear surface when viewed in cross-section. Although in this embodiment the second portion 2254 is a linear surface for ease of molding, the second portion 2254 could be of any possible shape such that the cable 2320 avoids contact with the second portion 2254 as the articulating portion 2200 is moved from a horizontal position down towards its maximum negative angular position. As the articulating portion 2200 is moved through its full range of angular positions, the interaction of the cable 2320 with the bearing surface 2250 is substantially identical to the interaction of the cable 320 of the first embodiment with the bearing surface 250 thereof, said interaction being explained in detail above.

Figure 19:
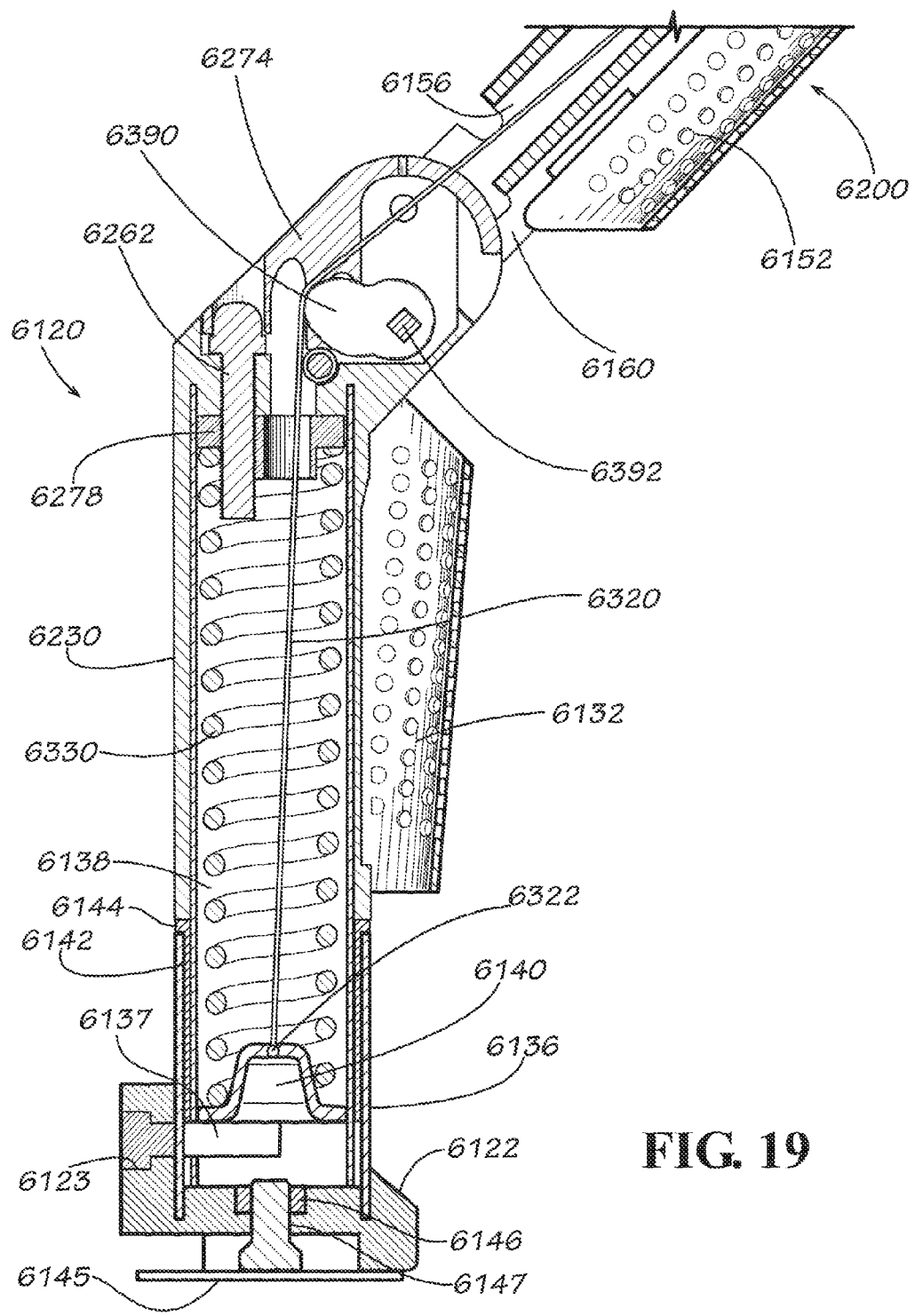
FIG. 19 is a sectional view of an additional embodiment of a base portion and an articulating portion in accordance with the present inventive concept.
Figure 20:
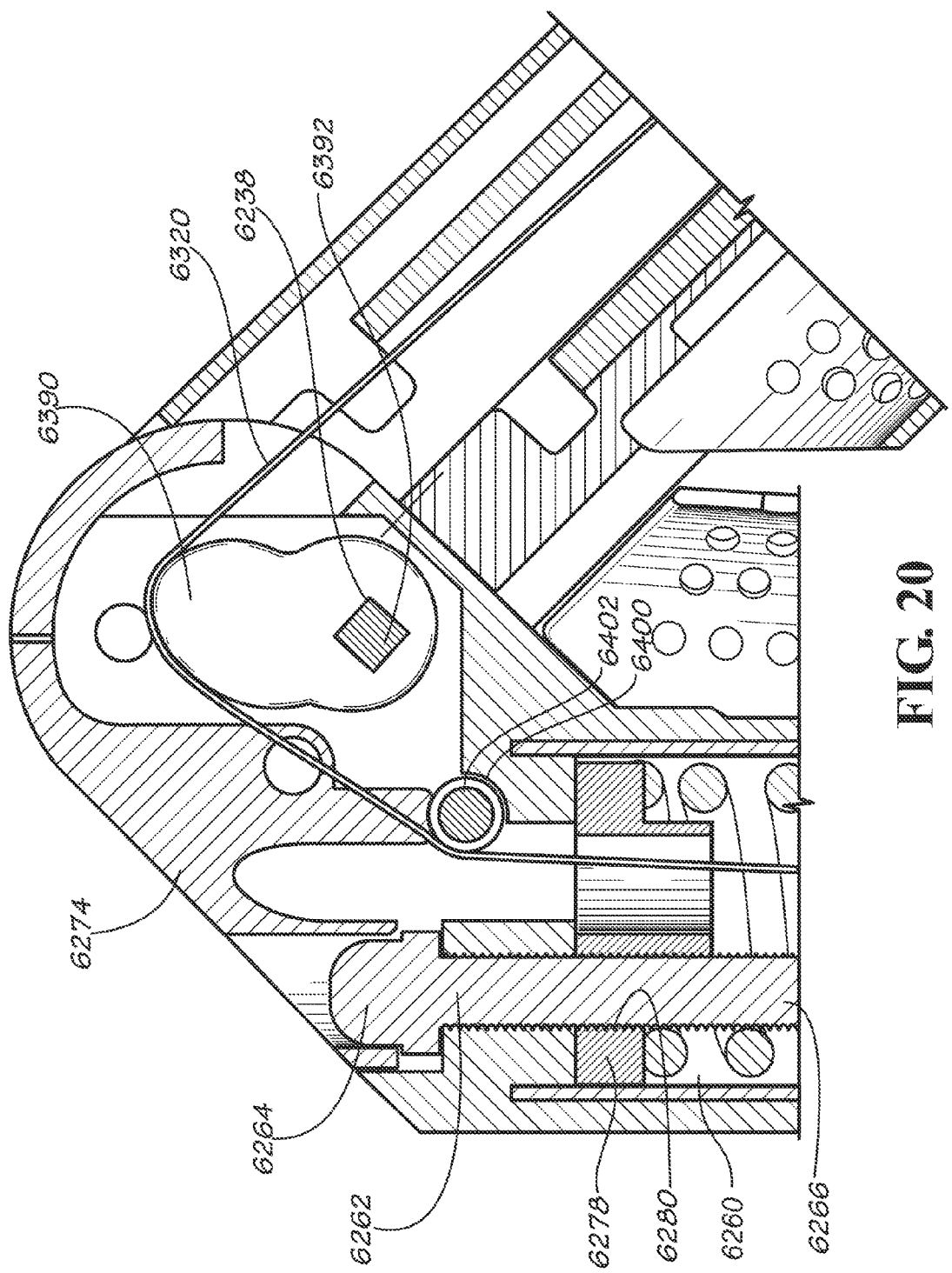
FIG. 20 is an enlarged partial view of the endcap of FIG. 19 with the articulating portion in its maximum negative angular position.
Figure 21:
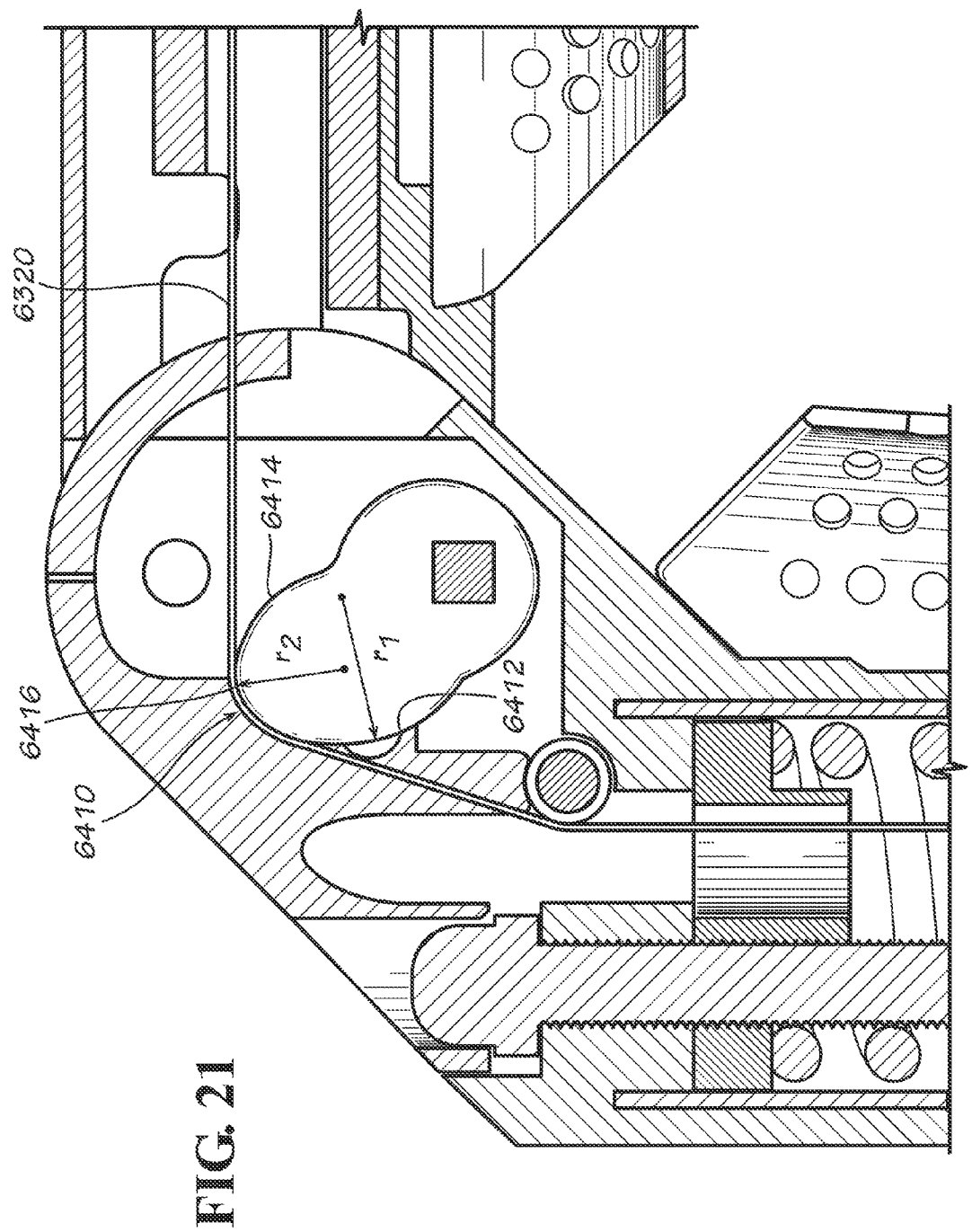
FIG. 21 is an enlarged partial view of the endcap of FIG. 19 with the articulating portion in its horizontal angular position.

FIGS. 19-21 depict a fifth embodiment of a base portion 6120 and part of the articulating portion of an extension arm in accordance with the present inventive concept. In this embodiment, elements shared with the third embodiment (extension arms 2110) are represented by reference numerals increased by factors of 4000 respectively therefrom.

It should be understood that this embodiment of the extension arm further includes a second endcap and a device mount (not shown), and may also include additional components such as an upper arm (not shown). In this embodiment, the undepicted components may be substantially identical to the respective components shown in the embodiment of FIGS. 9, 10A, and 12, and it should be understood that these components may also be replaced with suitable replacement components, such as those incorporated by reference herein, without deviating from the scope of this disclosure.

With reference to FIG. 19, the base portion 6120 includes a base plate 6122, the bottom surface of which is adapted to come into contact with a support surface (not shown). The base plate 6122 has a slot (not labeled) which accommodates a clamp or bracket member of any suitable construction, which may be fit and secured inside the slot if the user wishes to secure the base portion 6120 to a desktop or like surface. In this embodiment, the clamp or bracket member is affixed to the base plate 6122 via a mount bolt 6147, which is passed through a hole (not shown) in the clamp or bracket member and is held in place in the base plate 6122 via a jam nut 6146.

In this embodiment, the base plate 6122 also includes a screw hole 6123 through which a screw (not shown) may be passed. The screw passes through a screw hole (not labeled) in a mount cup or tube insert 6136 and a slot 6137 located in a spring tube 6138 to secure these parts to the base plate 6122. In this embodiment, the slot 6137 is elongated and wraps around approximately half of the circumference of the spring tube 6138. The slot 6137 acts in this embodiment as a rotational stop for the upper portions of the base portion 6120 (e.g. endcap 6230 and any parts attached thereto), i.e. by permitting these portions to have approximately 180 degrees of rotational freedom about the spring tube 6138. It should be understood that more or less rotational freedom could be provided by the slot 6137, or the slot could be removed altogether, within the scope of this disclosure. Further, the shaft of the screw being positioned through the slot 6137 prevents the spring tube 6138 from being accidentally pulled loose from the base portion 6120.

In this embodiment, the base portion 6120 further includes an endcap 6230. As described in further detail below, a device cable cover 6132 with a hollow body and open ends is releasably attached to the endcap 6230 via a pair of edge tabs (not shown) and a pair of center tabs (one tab shown, neither tab labeled) which are held in place within corresponding slots (edge slots not shown, center slot shown in FIG. 19 but not labeled) located on the endcap 6230. The addition of the center tabs to this embodiment of the device cable cover 6132 (and of the corresponding center slot in the endcap 6230) not only improves the connection between the device cable cover 6132 and the endcap 6230, but also prevents a device cable (not shown) from prying the device cable cover 6132 loose from the endcap 6230 as the base portion 6120 is rotated. The device cable cover 6132 is adapted to accommodate passage of the device cable therethrough so that the device cable is substantially hidden from view throughout the base portion 6120 of this embodiment of the extension arm. In this embodiment, the device cable cover 6132 includes a plurality of perforations (not labeled), for aesthetic purposes. In alternative embodiments, these perforations may be omitted.

In this embodiment, as in the embodiment shown in FIGS. 9, 10A, 11, and 12, the lower arm is an articulating portion 6200, as that term is defined above. As in the previous embodiments, the articulating portion 6200 of this embodiment has a range of angular positions which lie between a maximum positive angular position (shown in FIG. 19) and a maximum negative angular position (shown in FIG. 20). The angle of the articulating portion 6200 of this embodiment is measured in the same fashion as the third embodiment of the articulating portion 2200 described above, and includes the same values for the maximum positive and maximum negative angular positions, i.e. +45 and −45 degrees. It should be understood that, in other embodiments, the angular range of the articulating portion 6200 may be greater or lesser than the above-noted angular range, have greater or lesser absolute values for its maximum positive and maximum negative angular positions, or have maximum positive and maximum negative angular positions with absolute values that are not equal.

The parts and functionality of much of this embodiment correspond substantially to the embodiment shown in FIGS. 9, 10A, and 11-16, and therefore the interaction and functionality of many of the repeating parts will not be described in detail. It should be understood that although minor engineering or design differences may exist between some parts included in the present embodiment and the corresponding parts in the third embodiment of the extension arm 2110, these changes do not affect the overall functionality or construction of the present embodiment, unless such differences are specifically discussed below.

As best seen in FIG. 19, in this embodiment the spring 6330 has a tapered or approximately conical shape towards the bottom thereof, i.e. the individual coils which comprise the spring 6330 do not have uniform radii along the length of the spring 6330, and therefore the spring may have a non-constant spring rate. This spring shape may be advantageous over a spring of cylindrical shape for the reasons detailed above. Alternatively, multiple springs of different spring rates and/or shapes, as substantially disclosed above, could be used.

In this embodiment, the fixed bearing surface has been replaced with a pivoting member 6390 which includes a bearing surface 6410 (see FIG. 21). The pivoting member 6390 is connected to the articulating portion 6200, and more particularly the lower channel member 6160, via a pin 6392 inserted through a pin slot 6238 located in the pivoting member 6390 (see FIG. 20). A pair of pin holes (not shown) located on opposing sides of the endcap 6230 align with the pin slot 6238 and receive portions of the pin 6392 therethrough, without coming in contact with the pin 6392. In this embodiment, the pin holes are circular in cross section. As can be seen in FIGS. 19-21, in this embodiment both the shaft of the pin 6392 and the pin slot 6238 in the pivoting member 6390 are square in cross-section. In this embodiment, the diameter of the pin holes is large enough such that the shaft of the pin 6392 can freely rotate within the pin holes without coming in contact with the circumference of the circular openings. A pin bushing (not shown) is placed partially within each of the two pin holes in the endcap 6230. A portion of each pin bushing extends outside of the pin hole and comes in contact with the lower channel member 6160. In this embodiment, each pin bushing has a circular outer surface that can rotate freely within the circular inner surface of the respective pin hole and a square inner cutout that makes a friction fit with the pin 6392. The pin holes (not shown) that are located at the end of the lower channel member 6160 that engages the endcap 6230 are also square in cross-section and are sized so that the respective terminal ends of the pin 6392 make a friction fit with the pin holes in the lower channel member 6160. In alternative embodiments, it should be understood that the shaft of the pin 6392 and the shape of the pin slot 6238 in the pivoting member 6390 could be of any corresponding, non-circular shape so as to make a friction fit between the shaft of the pin 6392 and the pin slot 6238.

In this way, as the articulating portion 6200 is rotated through its range of angular positions, the pivoting member 6390 pivots about the pin 6392 in an amount corresponding with the amount of angular adjustment of the articulating portion 6200. For example, as the articulating portion is rotated from its maximum positive angular position (as shown in FIG. 19) to its maximum negative angular position (as shown in FIG. 20), the pin 6392, and by extension the attached pivoting member 6390, is rotated a corresponding amount (see, e.g., the relative positions of the articulating portion 6200 and the pivoting member 6390 in FIGS. 19, 20, and 21).

As best seen in FIGS. 20 and 21, the pivoting member 6390 includes the bearing surface 6410, which in this embodiment includes a first portion 6412, a second portion 6414, and a transition surface 6416. In cross-section, the first portion 6412 is in the shape of a first geometric arc having a radius $r_1$, and the transition surface is in the shape of a second geometric arc having a radius $r_2$. In this embodiment the second portion 6414 is curved, though it should be understood that the second portion 6414 could have any shape within the scope of this invention, for example linear.

As the articulating portion 6200 is rotated through its range of angular positions, the path of the cable 6320 is altered by the rotation of the pivoting member 6390 and the contact between the cable 6320 and the bearing surface 6410. In FIG. 19, for example, where the articulating portion 6200 is in its maximum positive angular position, the cable 6320 is in contact with the transition surface 6416, but does not contact the first portion 6412. As the articulating portion 6200 is rotated downwardly towards the horizontal angular position (shown in FIG. 20), the cable 6320 comes in contact with an increasing amount of the first portion 6412. As the articulating portion 6200 is rotated downwardly towards the maximum negative angular position (shown in FIG. 21), the cable 6320 continues to come in contact with an increasing amount of the first portion 6412, until at the maximum negative angular position the cable 6320 is in contact with a maximum amount of the first portion 6412 and remains in contact with the transition surface 6416.

In this embodiment, a cable roller 6400 is included to prevent the cable 6320 from contacting the edges of the endcap 6230 when the articulating portion is positioned throughout a particular range of articulating arm angular positions in which the pivoting member 6390 does not extend far enough over the cable passageway (not labeled) in the clevis nut 6278 to prevent the cable 6320 from contacting the internal portions of the endcap 6230. The cable roller 6400 is tubiform in shape and located around a pin 6402, which is fitted into and held in place within a pair of slots (not labeled) which are integrally molded within the interior surfaces of the endcap 6230.

It should be understood that Equations 1-6 are equally applicable to this embodiment. As seen in FIGS. 19-21, as the pivoting member 6390 pivots about the pin slot 6238, the path of the cable 6320 is altered due to the unique shapes of the components of the bearing surface 6410. As in the previous embodiments described above, in this embodiment the shape of the bearing surface 6410 was selected so as to approximate a set of values of $D_t$ (see Equation 3) so as to approximately balance Equations 2 and 3. It should be understood that, in this embodiment, for purposes of calculating $D_t$, the rotational axis corresponds with the center of the shaft of the pin 6392.

As the pivoting member 6390 pivots, it presses into the cable 6320, and the resulting increase in friction between the bearing surface 6410 and the cable 6320 reduces the likelihood that the cable 6320 will slide about the bearing surface 6410. In this embodiment, the path of the cable 6320 as it engages the bearing surface 6410 is different from the path of the cable of the embodiments described above as the cable wraps around the fixed bearing surface. In other words, in this embodiment, the value of $D_t$ at any selected angular position of the articulating arm is similar, but not identical, to the value of $D_t$ in the fixed bearing surface embodiments described above. What is consistent between all of the embodiments described herein is the approximate counterbalancing of the object-mass force and supporting force, as described in Equations 1-6, above.

In developing the present embodiment, it was desired to approximate a "unit pull" of the cable 6320 (for example, approximately 1 inch (2.5 cm)) between the maximum positive angular position and maximum negative angular position of the articulating portion 6200. The unit pull is defined as movement of the cable 6320 relative to the spring 6330. Because the cable 6320 is attached to the spring 6330, a unit pull results in an equal amount of compression of the spring 6330 through the range of angular positions of the articulating portion 6200. In this way, a known quantity of restorative force would be generated by the spring 6330 and transferred along the length of the cable 6320, as calculated by Equation 4 above based on the known spring rate of the spring 6330. For the sub-horizontal range of angular positions of the articulating portion 6200, less counterbalance force is required than through the above-horizontal range of angular positions. Accordingly, the bearing surface 6410 was designed so that less than half of the unit pull of the cable 6320 occurs through the sub-horizontal range of angular positions than through the above-horizontal range of angular positions. In the present embodiment, approximately 55% of the unit pull of the cable 6320 occurs through the above-horizontal range of angular positions of the articulating portion, and the remaining approximately 45% of the unit pull of the cable 6320 occurs through the sub-horizontal range of angular positions.

In additional embodiments, the herein disclosed inventive concepts could be utilized in conjunction with other known articulating arm designs. For example, the herein disclosed inventive concepts may be incorporated within the extension arm disclosed in U.S. patent application Ser. No. 11/544,076, as noted above.

In further additional embodiments according to the herein disclosed inventive concepts, a spring or other force-generating means, and any means for adjusting the compression state thereof, for example a clevis bolt and a clevis nut or spring adjuster, could be located entirely external to the structure of the extension arm. For example, these parts could be located mounted under a desktop, or on or in a wall, floor, or ceiling. In these embodiments, the spring may be either directly or indirectly coupled to a cable, which would be connected to the extension arm. In these embodiments, the end of the cable opposing the spring could terminate inside the extension arm, for example within the articulating portion or within an endcap attached thereto. Alternatively, the cable could connect to the exterior of the articulating portion. In these additional embodiments, a bearing surface according to the present disclosure could be located either within or external to the extension arm, and the cable would be routed about said bearing surface. It will be appreciated by one having ordinary skill in the relevant art that the additional embodiments disclosed above could be used in conjunction with additional objects other than extension arms for supporting electronic devices, including but not limited to a keyboard tray or adjustable-height cart, boom arms for holding medical devices or accessories, or furniture items.

While the principles of the inventive concept have been described above in connection with preferred embodiments, it is to be clearly understood that this description is made only by way of example and not as a limitation of the scope of the inventive concept.

The invention claimed is:

1. An arm for supporting an electronic device, the arm comprising:
    a base portion having a support mount that is attachable to a support surface such that the base portion is secured to the support surface when the support mount is attached to the support surface;
    an articulating portion having a first end, a second end, a top surface, and a range of angular positions, the first end being connected to a first endcap and being rotatable about a first pivot axis that corresponds with the first endcap, wherein the first endcap is connected to the base portion, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being operationally configured to maintain a substantially constant relative rotational position between the first endcap and the second endcap throughout the range of angular positions, the articulating portion further comprising upper and lower channel members that remain parallel to each other as the articulating portion is moved through its range of angular positions;
    a cable having first and second connection points, the first connection point being located within the articulating portion;
    a force-supplying component connected to the first or second connection point, the force-supplying component being operationally configured to exert a restorative force through the cable so that a supporting force is exerted on the articulating portion, the supporting force acting to oppose rotation of the second end of the articulating portion in the negative rotational direction; and a pivoting member including a bearing surface having a profile, the bearing surface being located such that it maintains contact with the cable throughout the range of angular positions, the profile being shaped so that the supporting force increases as the articulating portion is rotated from the maximum positive angular position to the horizontal angular position and decreases as the articulating portion is rotated from the horizontal angular position to the maximum negative angular position, wherein the pivoting member rotates with the articulating portion about the first pivot axis and wherein the second connection point of the cable is located external to the articulating portion and not directly on the bearing surface, wherein the pivoting member and the articulating portion are pivotable about a pin having a non-circular cross section.

2. An arm for supporting an electronic device, the arm comprising:

a base portion having a support mount that is attachable to a support surface such that the base portion is secured to the support surface when the support mount is attached to the support surface;

an articulating portion having a first end, a second end, a top surface, and a range of angular positions, the first end being connected to a first endcap and being rotatable about a first pivot axis that corresponds with the first endcap, wherein the first endcap is connected to the base portion, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being operationally configured to maintain a substantially constant relative rotational position between the first endcap and the second endcap throughout the range of angular positions, the articulating portion further comprising upper and lower channel members that remain parallel to each other as the articulating portion is moved through its range of angular positions;

a cable having first and second connection points, the first connection point being located within the articulating portion;

a force-supplying component connected to the first or second connection point, the force-supplying component being operationally configured to exert a restorative force through the cable so that a supporting force is exerted on the articulating portion, the supporting force acting to oppose rotation of the second end of the articulating portion in the negative rotational direction; and a pivoting member including a bearing surface having a profile, the bearing surface being located such that it maintains contact with the cable throughout the range of angular positions, the profile being shaped so that the supporting force increases as the articulating portion is rotated from the maximum positive angular position to the horizontal angular position and decreases as the articulating portion is rotated from the horizontal angular position to the maximum negative angular position, wherein the pivoting member rotates with the articulating portion about the first pivot axis and wherein the second connection point of the cable is located external to the articulating portion and not directly on the bearing surface, wherein the force-supplying component comprises at least one coiled spring, wherein the coiled spring is comprised of a plurality of coils, each of the plurality of coils having a radius, the radii of at least some of the plurality coils being different than others of the plurality of coils.

3. An arm for supporting an electronic device, the arm comprising:

a base portion having a support mount that is attachable to a support surface such that the base portion is secured to the support surface when the support mount is attached to the support surface;

an articulating portion having a first end, a second end, a top surface, and a range of angular positions, the first end being connected to a first endcap and being rotatable about a first pivot axis that corresponds with the first endcap, wherein the first endcap is connected to the base portion, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being operationally configured to maintain a substantially constant relative rotational position between the first endcap and the second endcap throughout the range of angular positions, the articulating portion further comprising upper and lower channel members that remain parallel to each other as the articulating portion is moved through its range of angular positions;

a cable having first and second connection points, the first connection point being located within the articulating portion;

a force-supplying component connected to the first or second connection point, the force-supplying component being operationally configured to exert a restorative force through the cable so that a supporting force is exerted on the articulating portion, the supporting force acting to oppose rotation of the second end of the articulating portion in the negative rotational direction; and a pivoting member including a bearing surface having a profile, the bearing surface being located such that it maintains contact with the cable throughout the range of angular positions, the profile being shaped so that the supporting force increases as the articulating portion is rotated from the maximum positive angular position to the horizontal angular position and decreases as the articulating portion is rotated from the horizontal angular position to the maximum negative angular position, wherein the pivoting member rotates with the articulating portion about the first pivot axis and wherein the second connection point of the cable is located external to the articulating portion and not directly on the bearing surface, wherein the force-supplying component is located within the base portion.

4. An arm for supporting an electronic device, the arm comprising:
- a base portion having a support mount that is attachable to a support surface such that the base portion is secured to the support surface when the support mount is attached to the support surface;
- an articulating portion having a first end, a second end, a top surface, and a range of angular positions, the first end being connected to a first endcap and being rotatable about a first pivot axis that corresponds with the first endcap, wherein the first endcap is connected to the base portion, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being operationally configured to maintain a substantially constant relative rotational position between the first endcap and the second endcap throughout the range of angular positions, the articulating portion further comprising upper and lower channel members that remain parallel to each other as the articulating portion is moved through its range of angular positions;
- a cable having first and second connection points, the first connection point being located within the articulating portion;
- a force-supplying component connected to the first or second connection point, the force-supplying component being operationally configured to exert a restorative force through the cable so that a supporting force is exerted on the articulating portion, the supporting force acting to oppose rotation of the second end of the articulating portion in the negative rotational direction; and
- a pivoting member including a bearing surface having a profile, the bearing surface being located such that it maintains contact with the cable throughout the range of angular positions;
- wherein the cable is operationally configured to move a unit pull, wherein the unit pull is defined as the distance that the cable moves relative to the force-supplying component when the articulating portion is rotated from the maximum positive angular position to the maximum negative angular position;
- wherein the profile is shaped so that less than half of the unit pull occurs when the articulating portion is rotated from the maximum positive angular position to the horizontal angular position and more than half of the unit pull occurs when the articulating portion is rotated from the horizontal angular position to the maximum negative angular position,
- wherein the pivoting member rotates with the articulating portion about the first pivot axis and
- wherein the second connection point of the cable is located external to the articulating portion and not directly on the bearing surface.

5. An arm for supporting an electronic device, the arm comprising:
- a base portion having a support mount that is attachable to a support surface such that the base portion is secured to the support surface when the support mount is attached to the support surface;
- an articulating portion having a first end, a second end, a top surface, and a range of angular positions, the first end being connected to a first endcap and being rotatable about a first pivot axis that corresponds with the first endcap, wherein the first endcap is connected to the base portion, the second end being connected to a second endcap, the range of angular positions comprising a positive range wherein the slope of a line drawn along the top surface from the first end to the second end has a positive value, a horizontal angular position wherein the slope of the line has a value of zero, a negative range wherein the slope of the line has a negative value, a maximum positive angular position, a maximum negative angular position, and a negative rotational direction, the articulating arm being operationally configured to maintain a substantially constant relative rotational position between the first endcap and the second endcap throughout the range of angular positions, the articulating portion further comprising upper and lower channel members that remain parallel to each other as the articulating portion is moved through its range of angular positions;
- a cable having first and second connection points, the first connection point being located within the articulating portion;
- a pivoting member including a force-supplying component connected to the first or second connection point, the force-supplying component being operationally configured to exert a restorative force through the cable so that a supporting force is exerted on the articulating portion, the supporting force acting to oppose rotation of the second end of the articulating portion in the negative rotational direction;
- a bearing surface having a profile, the bearing surface being positioned such that it maintains contact with the cable throughout the range of angular positions, the bearing surface being part of a pivoting member that rotates with the articulating portion and about the first pivot axis, the profile being shaped so that the supporting force increases as the articulating portion is rotated from the maximum positive angular position to the horizontal angular position and decreases as the articulating portion is rotated from the horizontal angular position to the maximum negative angular position; and
- an adjustable clevis that is operationally configured to be adjustable in order to change the range of values of the supporting force that is exerted on the articulating portion by the cable throughout the range of angular positions,
- wherein the pivoting member rotates with the articulating portion about the first pivot axis and
- wherein the second connection point of the cable is located external to the articulating portion and not directly on the bearing surface,
- wherein the force-supplying component is located within the base portion.

6. The arm of claim 4, wherein the force-supplying component is located within the base portion.

* * * * *